United States Patent
Davison et al.

(10) Patent No.: US 10,512,355 B2
(45) Date of Patent: Dec. 24, 2019

(54) DEVICE FOR SEPARATING SOLID FOOD FROM LIQUID

(71) Applicant: TONOGA INC., Petersburgh, NY (US)

(72) Inventors: George Davison, Pittsburgh, PA (US); John Frederic Cooper, Barrington, IL (US)

(73) Assignee: TONOGA INC., Petersburgh, NY (US)

( * ) Notice: Subject to any disclaimer, the term of this patent is extended or adjusted under 35 U.S.C. 154(b) by 0 days.

(21) Appl. No.: 15/384,987

(22) Filed: Dec. 20, 2016

(65) Prior Publication Data

US 2017/0099975 A1    Apr. 13, 2017

Related U.S. Application Data

(63) Continuation of application No. 13/936,549, filed on Jul. 8, 2013.

(60) Provisional application No. 61/668,916, filed on Jul. 6, 2012.

(51) Int. Cl.
*A47J 19/00* (2006.01)
*A47J 43/22* (2006.01)
*A47J 36/08* (2006.01)

(52) U.S. Cl.
CPC .............. *A47J 19/00* (2013.01); *A47J 36/08* (2013.01); *A47J 43/22* (2013.01); *Y10T 29/49826* (2015.01)

(58) Field of Classification Search
CPC ....................................................... A47J 36/08
See application file for complete search history.

(56) References Cited

U.S. PATENT DOCUMENTS

| | | | | |
|---|---|---|---|---|
| 11,221 A * | 7/1854 | Gleason | ................ | A47J 36/08 210/466 |
| 30,046 A * | 9/1860 | Buckins | ................ | A47J 36/08 210/466 |
| 59,885 A * | 11/1866 | Wright | ................ | A47J 36/08 210/466 |
| 66,753 A * | 7/1867 | Van Auken et al. | .... | A47J 36/08 210/466 |
| 68,793 A * | 9/1867 | Rossman | ................ | A47J 36/08 210/466 |
| 85,827 A * | 1/1869 | Holmes | ................ | A47J 36/08 210/245 |
| 87,904 A * | 3/1869 | Bingham | ................ | A47J 36/08 210/466 |
| 110,148 A * | 12/1870 | Leach | ................ | A47J 36/08 210/469 |
| 118,896 A * | 9/1871 | Barker | ................ | A47J 36/08 210/245 |
| 123,261 A * | 1/1872 | Johnson | ................ | A47J 36/08 210/466 |

(Continued)

*Primary Examiner* — Robert J Popovics
(74) *Attorney, Agent, or Firm* — Heslin Rothenberg Farley Mesiti P.C.; Kristian E. Ziegler, Esq.

(57) ABSTRACT

A kitchen utensil or device, specifically a strainer, is constructed and adapted to attach removably to the side of a pan, pot, or bowl, to provide a convenient means to allow for the separation of solid food product from liquid. The strainer includes a generally planar top surface, having a plurality of small gauge holes, slits, or openings in its surface. The holes are effective to allow a liquid to pass through the surface of the utensil while retaining the solid food product. The device is attachable by a clip to the rim of an existing pan, pot, or bowl.

18 Claims, 37 Drawing Sheets

(56) References Cited

U.S. PATENT DOCUMENTS

| | | | | |
|---|---|---|---|---|
| 128,800 A * | 7/1872 | Kendall | A47J 36/08 | 210/466 |
| 136,467 A * | 3/1873 | Thomson | A47J 36/08 | 210/245 |
| 144,614 A * | 11/1873 | Greenough | A47J 36/08 | 210/469 |
| 157,847 A * | 12/1874 | Lipman et al. | A47J 36/08 | 210/469 |
| 160,163 A * | 2/1875 | Colgrove | E05B 65/0841 | 292/241 |
| 178,348 A * | 6/1876 | Tingley | A47J 36/08 | 210/466 |
| 190,170 A * | 5/1877 | Thrift | A47J 36/08 | 210/466 |
| 194,354 A * | 8/1877 | Jones | A47J 36/08 | 210/466 |
| 194,571 A * | 8/1877 | Beaudette | A47J 36/08 | 210/245 |
| 195,507 A * | 9/1877 | Heuermann | A47J 36/08 | 210/466 |
| 197,836 A * | 12/1877 | Dodge | A47J 36/08 | 210/466 |
| 200,976 A * | 3/1878 | Campbell | A47J 36/08 | 210/469 |
| 225,246 A * | 3/1880 | Thomson | A47J 36/08 | 210/245 |
| 244,877 A * | 7/1881 | Ford | A47J 36/08 | 210/466 |
| 247,780 A * | 10/1881 | Randall | A47J 36/08 | 210/469 |
| 249,494 A * | 11/1881 | Alden | A47J 36/08 | 210/469 |
| 254,500 A * | 3/1882 | Obermann | A47J 36/08 | 222/189.07 |
| 262,350 A * | 8/1882 | Bedell | A47J 36/08 | 210/466 |
| 265,126 A * | 9/1882 | Miller | A47J 36/08 | 210/469 |
| 265,403 A * | 10/1882 | Gaylord | A47J 36/08 | 210/245 |
| 310,494 A * | 1/1885 | Cornell | A47J 36/08 | 210/466 |
| 316,825 A * | 4/1885 | Rasner | A47J 36/08 | 210/469 |
| 322,189 A * | 7/1885 | Lyon | A47J 36/08 | 210/245 |
| 326,629 A * | 9/1885 | Clother | A47J 36/08 | 210/245 |
| 329,467 A * | 11/1885 | Manley | A47J 36/08 | 210/466 |
| 334,560 A * | 1/1886 | Bradford | A47J 36/08 | 210/245 |
| 355,622 A * | 1/1887 | Oliver | A47J 36/08 | 210/245 |
| 358,333 A * | 2/1887 | Cary | A47J 36/08 | 210/245 |
| 364,341 A * | 6/1887 | Godkin | A47J 36/08 | 292/8 |
| 370,639 A * | 9/1887 | McMillin | A47J 36/08 | 210/466 |
| 384,977 A * | 6/1888 | Hopkins | A47J 36/08 | 210/469 |
| 405,216 A * | 6/1889 | Kendrick | A47J 36/08 | 210/469 |
| 405,373 A * | 6/1889 | Pfeil | A47J 36/08 | 210/466 |
| 419,520 A * | 1/1890 | Hauck | A47J 36/08 | 210/469 |
| 434,452 A * | 8/1890 | Matthews | A47J 36/08 | 210/465 |
| 481,166 A * | 8/1892 | Diack | A47J 36/08 | 210/245 |
| 496,278 A * | 4/1893 | Pfeil | A47J 36/08 | 210/245 |
| 498,569 A * | 5/1893 | Peterson | E05D 5/08 | 16/382 |
| 523,720 A * | 7/1894 | Fischer | A47J 36/08 | 210/466 |
| 542,575 A * | 7/1895 | Smith | A47J 36/08 | 210/466 |
| 549,276 A * | 11/1895 | Pfeil | A47J 36/08 | 210/466 |
| 554,048 A * | 2/1896 | Bolus | A47J 36/08 | 210/465 |
| 567,679 A * | 9/1896 | Ferber | A47J 36/08 | 210/466 |
| 567,763 A * | 9/1896 | Bolus | A47J 36/08 | 222/467 |
| 569,260 A * | 10/1896 | Walton | A47J 36/08 | 210/469 |
| 590,902 A * | 9/1897 | Nearing | A47J 36/08 | 210/469 |
| 595,407 A * | 12/1897 | Pfeil | A47J 36/08 | 210/466 |
| 601,589 A * | 3/1898 | Rochat | A47J 36/08 | 210/469 |
| 612,422 A * | 10/1898 | Karsner | A47J 36/08 | 222/467 |
| 615,468 A * | 12/1898 | Yeager | A47J 36/08 | 210/465 |
| 617,880 A * | 1/1899 | Kuster | A47J 36/08 | 210/245 |
| 625,523 A * | 5/1899 | Totman | A47J 36/08 | 210/465 |
| 629,742 A * | 7/1899 | Carden | A47J 36/08 | 210/245 |
| 630,414 A * | 8/1899 | Schwartz | A47J 36/08 | 222/189.07 |
| 634,808 A * | 10/1899 | Doble | A47J 36/08 | 222/467 |
| 639,208 A * | 12/1899 | Buckley | A47J 36/08 | 210/465 |
| 665,343 A * | 1/1901 | Preil | A47J 36/08 | 210/469 |
| 673,302 A * | 4/1901 | Talladay | A47J 36/08 | 210/245 |
| 674,569 A * | 5/1901 | Wilson | A47J 36/08 | 210/245 |
| 674,948 A * | 5/1901 | Tresselt | A47J 36/08 | 210/245 |
| 676,603 A * | 6/1901 | Drake | A47J 36/08 | 210/245 |
| 677,466 A * | 7/1901 | Ortner | A47J 36/08 | 210/245 |
| 687,747 A * | 12/1901 | Harding | A47J 36/08 | 210/465 |
| 688,397 A * | 12/1901 | Des Isles | A47J 36/08 | 210/469 |
| 690,828 A * | 1/1902 | Brown | B65D 25/32 | 220/318 |
| 695,593 A * | 3/1902 | Warner | A47J 36/08 | 210/469 |
| 706,206 A * | 8/1902 | Szentjanossy | A47J 36/08 | 210/245 |
| 710,681 A * | 10/1902 | Grothe | A47J 36/08 | 210/245 |
| 736,169 A * | 8/1903 | Stone | A47J 36/08 | 210/245 |
| 737,014 A * | 8/1903 | O'Neil | A47J 36/08 | 210/469 |
| 737,171 A * | 8/1903 | Szentjanossy | A47J 36/08 | 210/245 |
| 745,109 A * | 11/1903 | Lafrentz | A47J 36/08 | 210/466 |
| 760,753 A * | 5/1904 | Pickett | A47J 36/08 | 210/245 |
| 766,066 A * | 7/1904 | Sanders | A47J 36/08 | 210/245 |

(56) References Cited

U.S. PATENT DOCUMENTS

| | | | | |
|---|---|---|---|---|
| 831,353 A * | 9/1906 | Johnston | ............... | A47J 36/08 210/245 |
| 833,606 A * | 10/1906 | Kelly | ............... | A47J 36/08 210/465 |
| 852,472 A * | 5/1907 | Tracey | ............... | A47J 36/08 210/469 |
| 857,329 A * | 6/1907 | Carey | ............... | A47J 36/08 210/465 |
| 874,138 A * | 12/1907 | Trett | ............... | A47J 36/08 210/245 |
| 874,437 A * | 12/1907 | Puckett | ............... | A47J 36/08 210/245 |
| 887,098 A * | 5/1908 | Klein | ............... | A47J 36/08 210/245 |
| 898,284 A * | 9/1908 | Stuber | ............... | A47J 36/08 210/245 |
| 900,952 A * | 10/1908 | Quackenboss et al. | | A47J 36/08 210/245 |
| 906,272 A * | 12/1908 | Paulus | ............... | A47J 36/06 126/381.1 |
| 908,121 A * | 12/1908 | Norton | ............... | A47J 36/08 210/245 |
| 921,888 A * | 5/1909 | Ressler | ............... | A47J 36/08 210/245 |
| 936,025 A * | 10/1909 | Ostrander | ............... | A47J 36/08 210/245 |
| 937,168 A * | 10/1909 | Newman | ............... | A47J 36/08 210/466 |
| 947,025 A * | 1/1910 | Pearl et al. | ............... | A47J 36/08 210/245 |
| 964,815 A * | 7/1910 | Rotondo | ............... | A47J 36/08 210/469 |
| 982,760 A * | 1/1911 | Bernau | ............... | A47J 36/08 210/245 |
| 999,376 A * | 8/1911 | Lillegord | ............... | A47J 36/08 210/245 |
| 1,015,293 A * | 1/1912 | Carlson | ............... | A47J 36/08 210/466 |
| 1,017,183 A * | 2/1912 | Spencer | ............... | A47J 36/08 210/245 |
| 1,042,272 A * | 10/1912 | Reynolds | ............... | A47J 36/08 210/466 |
| 1,050,794 A * | 1/1913 | Bell | ............... | A47J 36/08 210/245 |
| 1,053,023 A * | 2/1913 | Frederick | ............... | A47J 36/08 210/466 |
| 1,053,780 A * | 2/1913 | Brooks | ............... | A47J 36/08 210/469 |
| 1,055,541 A * | 3/1913 | Keltner | ............... | A47J 36/08 210/469 |
| 1,058,146 A * | 4/1913 | Burdin | ............... | A47J 36/08 210/469 |
| 1,058,569 A * | 4/1913 | Eishen | ............... | A47J 36/08 222/467 |
| 1,069,812 A * | 8/1913 | Ross | ............... | A47J 36/08 210/465 |
| 1,073,141 A * | 9/1913 | Kerlinger | ............... | A47J 36/08 210/469 |
| 1,130,756 A * | 3/1915 | Nash | ............... | A47J 36/08 210/465 |
| 1,137,896 A * | 5/1915 | Poundstone | ............... | A47J 36/08 210/469 |
| 1,166,475 A * | 1/1916 | Paquette | ............... | B65D 51/242 220/212.5 |
| 1,183,468 A * | 5/1916 | Knight | ............... | A47J 36/08 210/469 |
| 1,196,570 A * | 8/1916 | Marsha | ............... | A47J 36/08 210/465 |
| 1,209,026 A * | 12/1916 | Pritchard | ............... | A47J 36/08 210/469 |
| 1,210,301 A * | 12/1916 | Galletta | ............... | A47J 36/08 210/245 |
| 1,210,813 A * | 1/1917 | Koopman | ............... | A47J 36/08 210/245 |
| 1,214,800 A * | 2/1917 | Link | ............... | A47J 36/08 210/469 |
| 1,215,929 A * | 2/1917 | Guth | ............... | A47J 36/08 210/245 |
| 1,225,047 A * | 5/1917 | Milligan | ............... | A47J 36/08 210/469 |
| 1,235,625 A * | 8/1917 | Wineman | ............... | A47J 36/08 210/245 |
| 1,241,010 A * | 9/1917 | Paquette | ............... | A47J 36/08 210/245 |
| 1,241,448 A * | 9/1917 | Sherman | ............... | A47J 36/08 210/469 |
| 1,258,503 A * | 3/1918 | Tritle | ............... | E05D 3/022 16/233 |
| 1,259,183 A * | 3/1918 | Wildy | ............... | A47J 36/08 222/189.07 |
| 1,260,794 A * | 3/1918 | Paquette | ............... | A47J 36/08 210/245 |
| 1,265,116 A * | 5/1918 | Rogers | ............... | A47J 36/08 210/245 |
| 1,269,902 A * | 6/1918 | Butler | ............... | A47J 36/08 210/469 |
| 1,288,644 A * | 12/1918 | Mazzuca | ............... | A47J 36/08 210/245 |
| 1,298,940 A * | 4/1919 | Harrison | ............... | A47J 36/08 210/245 |
| 1,314,180 A * | 8/1919 | Ayres | ............... | A47J 36/08 210/469 |
| 1,317,066 A * | 9/1919 | Bebb | ............... | A47J 36/08 210/469 |
| 1,325,613 A * | 12/1919 | Beebe | ............... | A47J 36/08 210/469 |
| 1,328,558 A * | 1/1920 | Brooks | ............... | A47J 36/08 210/469 |
| 1,334,908 A * | 3/1920 | Kinzel | ............... | A47J 36/12 220/832 |
| 1,354,085 A * | 9/1920 | Zisk | ............... | A47J 36/08 210/245 |
| 1,374,776 A * | 4/1921 | Stanley | ............... | A47J 36/08 210/469 |
| 1,377,684 A * | 5/1921 | Hollands | ............... | A47J 36/08 210/245 |
| 1,402,135 A * | 1/1922 | Barton | ............... | A23L 7/187 220/345.3 |
| 1,402,170 A * | 1/1922 | Manery | ............... | A47J 36/08 210/465 |
| 1,454,118 A * | 5/1923 | Karsack | ............... | A47J 36/08 292/83 |
| 1,498,588 A * | 6/1924 | Sturdevant | ............... | A47J 36/08 210/245 |
| 1,532,133 A * | 4/1925 | Gawronski | ............... | A47J 36/08 292/257 |
| 1,547,662 A * | 7/1925 | Miniere | ............... | A47J 36/10 220/324 |
| 1,554,261 A * | 9/1925 | Dahmen | ............... | A47J 36/12 220/848 |
| 1,578,466 A * | 3/1926 | Pearl | ............... | A47J 36/08 210/245 |
| 1,589,486 A * | 6/1926 | Sharpneck | ............... | A47J 36/08 210/465 |
| 1,624,276 A * | 4/1927 | Nelson | ............... | A01J 9/02 210/495 |
| 1,624,745 A * | 4/1927 | Kuhnast | ............... | A47J 36/08 210/465 |
| 1,624,926 A * | 4/1927 | Chovanec | ............... | A47J 36/08 210/469 |
| 1,636,240 A * | 7/1927 | Partridge | ............... | A47J 36/08 210/465 |
| 1,639,093 A * | 8/1927 | Kircher | ............... | A47J 36/08 210/245 |
| 1,662,343 A * | 3/1928 | Sharpneck | ............... | A47J 36/08 210/465 |

(56) References Cited

U.S. PATENT DOCUMENTS

| | | | | |
|---|---|---|---|---|
| 1,734,608 A * | 11/1929 | Anderson | A47J 36/08 | 220/212.5 |
| 1,745,243 A * | 1/1930 | Boyle | A47J 36/08 | 210/239 |
| 1,750,158 A * | 3/1930 | Blakeman | A47J 36/08 | 210/465 |
| 1,770,997 A * | 7/1930 | Schmitt | A47J 36/08 | 220/324 |
| 1,781,995 A * | 11/1930 | Alexander | A47J 36/08 | 210/469 |
| 1,875,303 A * | 8/1932 | Bird | A47J 36/08 | 210/245 |
| 1,897,304 A * | 2/1933 | Davis | A47J 36/08 | 210/469 |
| 1,916,710 A * | 7/1933 | Alexander | A47J 36/08 | 210/469 |
| 1,928,851 A * | 10/1933 | Devlin | A47J 36/08 | 210/469 |
| 1,947,149 A * | 2/1934 | Aupke | A47J 36/08 | 210/245 |
| 1,948,849 A * | 2/1934 | Dunlap | A47J 36/08 | 210/246 |
| 1,953,338 A * | 4/1934 | Claire | A47J 36/08 | 210/469 |
| 1,994,576 A * | 3/1935 | Dean | A47J 36/08 | 222/189.07 |
| 1,997,509 A * | 4/1935 | Betteridge | A47J 36/08 | 210/245 |
| 2,023,571 A * | 12/1935 | Blitz | A47J 36/08 | 210/245 |
| 2,026,701 A * | 1/1936 | Pearl | A47J 36/08 | 210/245 |
| 2,030,266 A * | 2/1936 | Pollock | A47J 36/08 | 210/245 |
| 2,047,176 A * | 7/1936 | Cisco | A47J 36/08 | 210/245 |
| 2,118,530 A * | 5/1938 | Smith | A47J 36/08 | 210/245 |
| 2,133,724 A * | 10/1938 | Smulski | A47J 36/08 | 210/469 |
| 2,185,897 A * | 1/1940 | Krause | A47J 36/08 | 210/244 |
| 2,218,367 A * | 10/1940 | Van Ness | A47J 36/08 | 99/339 |
| RE21,688 E * | 1/1941 | Van Ness | A47J 36/08 | 99/339 |
| 2,240,454 A * | 4/1941 | Badaracco | A47J 36/08 | 222/189.07 |
| 2,284,342 A * | 5/1942 | Quinby | A47J 36/08 | 210/465 |
| 2,303,841 A * | 12/1942 | Kircher | A47J 36/08 | 222/545 |
| 2,397,163 A * | 3/1946 | Serkes | A47J 36/08 | 210/469 |
| 2,397,176 A * | 3/1946 | Whiting | A47J 36/08 | 210/466 |
| 2,398,978 A * | 4/1946 | Udell | A47J 36/08 | 210/469 |
| 2,400,642 A * | 5/1946 | Hassel | A47J 36/08 | 210/469 |
| 2,463,209 A * | 3/1949 | Serkes | A47J 36/08 | 210/469 |
| 2,466,347 A * | 4/1949 | Ziemianin | A47J 36/08 | 210/465 |
| 2,499,016 A * | 2/1950 | Buckley | A47J 36/08 | 210/469 |
| 2,507,159 A * | 5/1950 | Holmgren | A47J 43/281 | 210/465 |
| 2,511,111 A * | 6/1950 | Jakubowski | A47J 36/08 | 210/466 |
| 2,520,382 A * | 8/1950 | Conrad | A47J 36/08 | 210/465 |
| 2,770,389 A * | 11/1956 | Drakoff | A47J 37/101 | 99/341 |
| D179,912 S * | 3/1957 | Marshall | D7/667 | |
| 2,808,938 A * | 10/1957 | Glover | A47J 36/08 | 210/469 |
| 3,065,855 A * | 11/1962 | Edwards | A47J 36/08 | 210/469 |
| 3,240,348 A * | 3/1966 | Serio | A47J 36/08 | 210/469 |
| 3,289,849 A * | 12/1966 | Livingston | A47J 36/08 | 210/469 |
| 3,301,404 A * | 1/1967 | Becker | A47J 36/08 | 210/465 |
| 3,390,781 A * | 7/1968 | Anderson | A47J 43/22 | 210/465 |
| D250,244 S | 11/1978 | Antolino | | |
| 4,220,534 A | 9/1980 | Perry | | |
| 4,258,694 A * | 3/1981 | Kato | A47J 37/101 | 126/299 C |
| 4,310,418 A * | 1/1982 | Busbey | A47J 36/08 | 210/467 |
| 4,403,711 A * | 9/1983 | Kyosuke | A47J 36/06 | 126/299 C |
| 4,626,352 A * | 12/1986 | Massey | A47J 36/08 | 210/469 |
| 4,873,918 A | 10/1989 | Goldman | | |
| D313,727 S * | 1/1991 | Gamez | D7/359 | |
| 5,035,800 A * | 7/1991 | Kopach | A47J 36/08 | 210/469 |
| 5,078,872 A | 1/1992 | Durant et al. | | |
| 5,178,761 A * | 1/1993 | Mohun | A47J 36/08 | 126/369 |
| 5,193,524 A * | 3/1993 | Loyd | A47J 27/58 | 126/374.1 |
| D347,964 S * | 6/1994 | Davis | D7/354 | |
| 5,613,618 A * | 3/1997 | Raoult | A47J 36/08 | 220/287 |
| 5,615,607 A | 4/1997 | Delaquis et al. | | |
| 5,653,881 A | 8/1997 | Bruss et al. | | |
| D386,940 S * | 12/1997 | Hess | 210/467 | |
| 5,730,045 A | 3/1998 | Delaquis et al. | | |
| 5,957,038 A | 9/1999 | Shimazaki | | |
| D420,848 S * | 2/2000 | Neidigh | D7/360 | |
| 6,035,766 A * | 3/2000 | Schirmer | A47J 27/12 | 126/369 |
| 6,092,670 A * | 7/2000 | Marriott | A47J 45/10 | 210/469 |
| D443,170 S * | 6/2001 | Brest | D7/315 | |
| D459,940 S * | 7/2002 | Stoll | D7/391 | |
| 6,457,590 B1 | 10/2002 | Sheridan | | |
| 6,520,383 B1 * | 2/2003 | Brest | A47J 36/06 | 210/467 |
| 6,536,603 B1 * | 3/2003 | Sollo | A47J 36/08 | 210/464 |
| 6,546,849 B1 * | 4/2003 | Shimazaki | A47J 36/08 | 210/465 |
| 6,550,146 B1 * | 4/2003 | Rouleau | A47J 43/285 | 30/325 |
| 6,568,314 B1 * | 5/2003 | Stepanova | A47J 36/08 | 210/464 |
| 6,732,636 B1 | 5/2004 | Germano | | |
| 6,789,683 B1 | 9/2004 | Fisher | | |
| 6,824,004 B1 * | 11/2004 | Wooderson | A47J 45/062 | 220/318 |
| 6,827,224 B2 | 12/2004 | Marriott et al. | | |
| 6,829,984 B1 * | 12/2004 | Leibowitz | A47J 37/108 | 99/339 |
| D513,944 S | 1/2006 | Kaposi | | |
| D526,541 S | 8/2006 | Repp et al. | | |
| 7,360,673 B2 * | 4/2008 | Abrahams | A47J 36/14 | 220/571.1 |
| 7,451,897 B2 | 11/2008 | PaPasodero | | |
| 7,798,372 B2 * | 9/2010 | Archer, Jr. | B65D 25/40 | 210/466 |
| 7,802,702 B2 * | 9/2010 | Archer, Jr. | B65D 25/40 | 210/466 |

(56) References Cited

U.S. PATENT DOCUMENTS

| | | | |
|---|---|---|---|
| 7,878,110 B1* | 2/2011 | Michnik | A47J 36/14 210/464 |
| D638,247 S* | 5/2011 | Yamada | D7/318 |
| 8,016,122 B2* | 9/2011 | Coudurier | A47J 36/08 210/464 |
| D664,004 S* | 7/2012 | Benishai | D7/543 |
| 8,518,251 B2* | 8/2013 | Greiner | A47J 36/08 210/232 |
| 8,567,456 B1 | 10/2013 | Francis | |
| 8,672,533 B2* | 3/2014 | Reyes | A47J 36/08 210/466 |
| 8,820,222 B2 | 9/2014 | Cloutier et al. | |
| 9,138,101 B2* | 9/2015 | Palmer | A47J 36/14 |
| 9,211,034 B2* | 12/2015 | Venot | A47J 45/071 |
| 9,289,800 B1* | 3/2016 | Rosado | A01B 1/08 |
| D801,130 S* | 10/2017 | Davison | A47J 19/00 D7/667 |
| D824,735 S* | 8/2018 | Chaudry | D7/668 |
| 10,307,008 B2* | 6/2019 | Davison | A47J 19/00 |
| 2003/0192823 A1* | 10/2003 | Marriott | A47J 36/08 210/470 |
| 2003/0192824 A1* | 10/2003 | Marriott | A47J 36/08 210/470 |
| 2004/0079755 A1* | 4/2004 | Graus | A47J 36/08 220/253 |
| 2004/0200851 A1* | 10/2004 | Wooderson | A47J 45/062 220/759 |
| 2004/0216620 A1 | 11/2004 | Quiggins et al. | |
| 2004/0250689 A1* | 12/2004 | De'Longhi | A47J 36/027 99/403 |
| 2004/0250690 A1* | 12/2004 | Restis | A47J 36/08 99/403 |
| 2005/0178805 A1 | 8/2005 | Abrahams | |
| 2006/0254976 A1 | 11/2006 | Cooper | |
| 2007/0227965 A1* | 10/2007 | Simard | A47J 36/08 210/469 |
| 2008/0196599 A1* | 8/2008 | Bhagat | A47J 27/21191 99/444 |
| 2008/0308489 A1* | 12/2008 | Coudurier | A47J 36/08 210/469 |
| 2009/0120965 A1* | 5/2009 | Archer, Jr. | B65D 25/40 222/189.07 |
| 2010/0288771 A1 | 11/2010 | Ek | |
| 2011/0272339 A1* | 11/2011 | Greiner | A47J 36/08 210/232 |
| 2013/0139707 A1* | 6/2013 | Walling, III | A47J 36/08 99/444 |
| 2013/0292345 A1 | 11/2013 | Jones | |
| 2014/0042106 A1* | 2/2014 | Davison | A47J 19/00 210/767 |
| 2014/0061206 A1* | 3/2014 | Lagostina | A47J 27/002 220/573.4 |
| 2014/0353316 A1* | 12/2014 | Lin | A47J 36/10 220/573.1 |
| 2017/0099975 A1* | 4/2017 | Davison | A47J 19/00 |
| 2017/0099976 A1* | 4/2017 | Davison | A47J 19/00 |
| 2018/0098657 A1* | 4/2018 | Tammera | A47J 37/101 |

* cited by examiner

SECTION A-A

SECTION C-C

DEVICE FOR SEPARATING SOLID FOOD FROM LIQUID

CROSS-REFERENCE TO RELATED APPLICATIONS

This application is a continuation of U.S. application Ser. No. 13/936,549, filed on Jul. 8, 2013, which claims priority to U.S. Provisional Patent Application No. 61/668,916, filed on Jul. 6, 2012, which applications are incorporated herein by reference in their entirety.

FIELD OF THE INVENTION

The present invention relates to a kitchen device, particularly a strainer, utilized to separate liquid from solid food products.

BACKGROUND OF THE INVENTION

Devices used to separate solid food products from liquid food products are a common item. Typically these devices are in the form of separate and distinct items, such as a strainer, colander, and the like, in which the solid food product and liquid food product are poured into the device, which then separates the two.

Alternatively, smaller utensils, such as slotted spoons and slotted ladles, have been designed to remove small portions of solid food product.

While these items are effective for their intended purposes, they do not provide a selective attachment to an existing container to allow for the separation of liquid from solid food products.

The present invention is directed to overcoming these and other deficiencies in the art.

BRIEF SUMMARY OF THE INVENTION

The present invention relates to a kitchen utensil or device, specifically a strainer, which is constructed and adapted to attach by removable means to the side of a pan, pot, or bowl, to provide a convenient means to allow for the separation of solid food product from liquid.

In one aspect, the present invention relates to a device for separating a solid component (e.g., a solid food product) from a liquid. The device comprises a strainer component coupled to an attachment component, where the strainer component comprises a surface having a plurality of holes effective to allow the liquid to pass through the surface while retaining the solid component, and where the attachment component is effective to secure the strainer component in place over a collection component (e.g., a pot, a pan, a bowl, and the like).

In one aspect, the present invention relates to a method of making the device for separating a solid component from a liquid. This method includes providing a strainer component and an attachment component; and coupling the strainer component to the attachment component.

In another aspect, the present invention relates to a method of separating a solid component from a liquid, which method comprises: providing a device as described herein; providing a liquid mixture comprising a solid component mixed with a liquid; and pouring the liquid mixture onto the surface of the device so that the liquid passes through the holes of the surface and the solid component is maintained on the surface, thereby separating the solid component from the liquid. In one embodiment, this method further comprises providing a collection component for collecting the liquid passed through the holes of the device or for maintaining the solid component after passing the liquid through the holes of the device.

In one embodiment, the strainer comprises a generally planar top surface, having a plurality of small gauge holes, slits, or openings in its surface. The holes being effective to allow a liquid to pass through the surface of the utensil while retaining the solid food product. The top surface having one lateral side curved to conform to the peripheral side of a typical pot, pan, or bowl.

In one embodiment, the device of the present invention includes a biasing band that extends normally downward from the curved lateral side. The biasing band has a degree of flex to allow the device to conform to the contour of a variety of different sized pans, pots, or bowls. In a particular embodiment, there is an opening between the top planar surface and the biasing band at or near the midpoint of the curved lateral side.

A spout is formed at this point of this opening to facilitate the flow of liquid from the container's cavity.

The device is attachable to the side of an existing pan, pot, bowl, or variations thereof by means of at least one clip member attached to the biasing band. Preferably the clip is secured by friction means to the peripheral lip of the pan, pot, or bowl.

In a particular embodiment, the device is constructed of a single integrated body, composed of a durable, washable, temperature resistant material, such as a nylon weave, silicon, or rubber. Alternatively, in another embodiment, the device may be constructed as separate components attached by appropriate means.

It is an object of the present invention to provide a device that may be selectively attached to an existing container, such as a pan, pot, bowl, or variation thereof, which will facilitate the separation of liquid from solid food products contained within the container.

It is a further object of the present invention to provide a device that may be selectively attached to a variety of different sized existing containers, such as pans, pots, bowls, or variations thereof which will facilitate the separation of liquid from solid food products contained within the container.

These and other objects, features, and advantages of this invention will become apparent from the following detailed description of the various aspects of the invention taken in conjunction with the accompanying drawings.

BRIEF DESCRIPTION OF DRAWINGS

For the purpose of illustrating aspects of the present invention, there are depicted in the drawings certain embodiments of the invention. However, the invention is not limited to the precise arrangements, dimensions, and instrumentalities of the embodiments depicted in the drawings. Further, as provided, like reference numerals contained in the drawings are meant to identify similar or identical elements.

FIG. 15 is a top view of the preferred embodiment of the present invention.

FIG. 16 is a bottom view of the preferred embodiment of the present invention.

FIG. 17 is a depiction of the lateral side biasing band of the second embodiment of the present invention.

FIG. 18 is a depiction of the anchoring clip of the second embodiment of the present invention.

DETAILED DESCRIPTION OF THE INVENTION

The present invention relates to a device for separating a solid component (e.g., a solid food product) from a liquid, methods of making the device, and methods of using the device. In particular, the present invention provides a kitchen utensil or device, specifically a strainer, which is constructed and adapted to attach by removable means to the side of any container, such as a pan, pot, bowl, or variations thereof to provide a convenient means to allow for the separation of a solid food product from liquid.

Figure 1A:
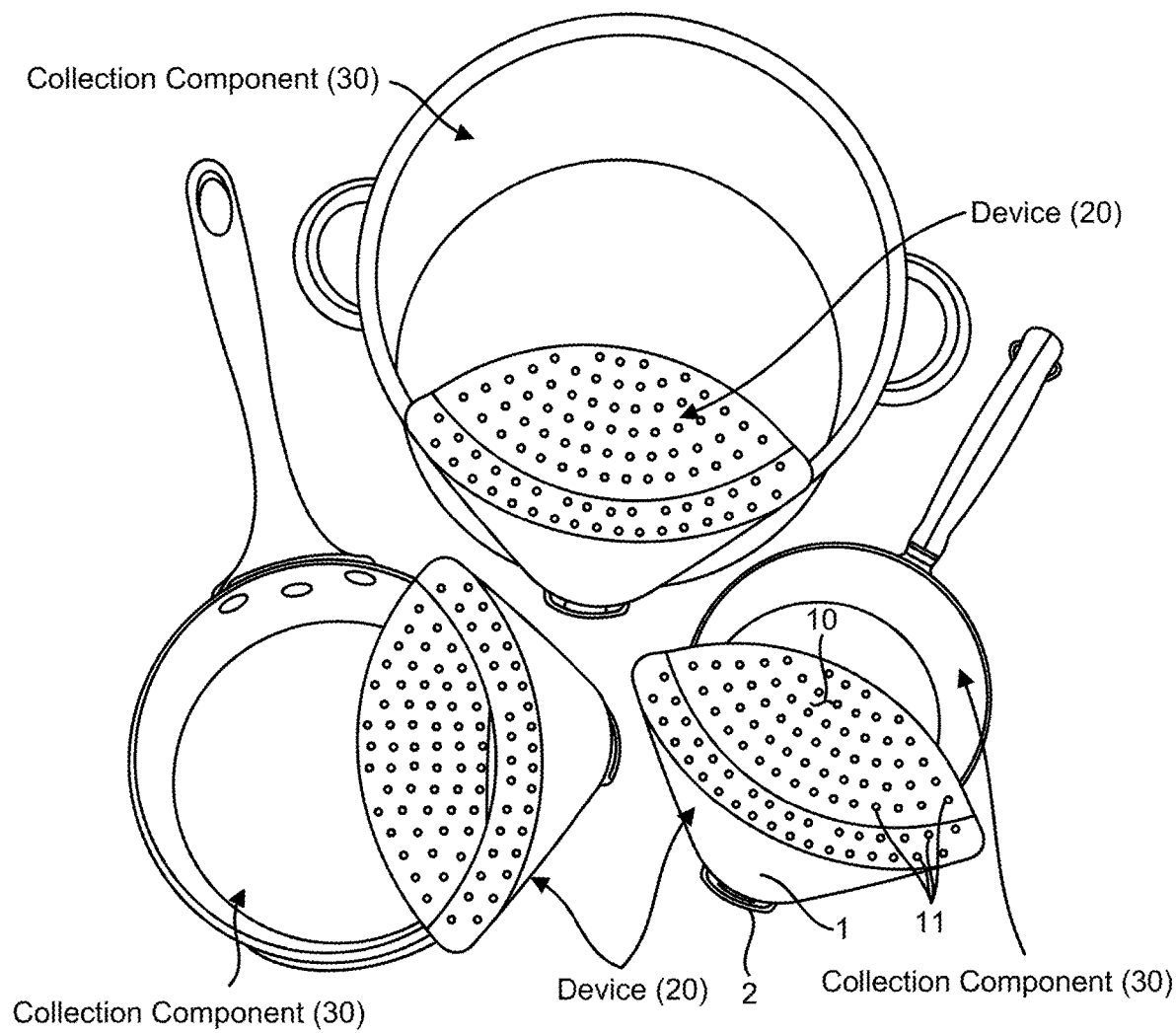
FIGS. 1A-1B are photographs of embodiments of the device of the present invention attached to various types of containers (e.g., pots and pans).
Figure 1B:
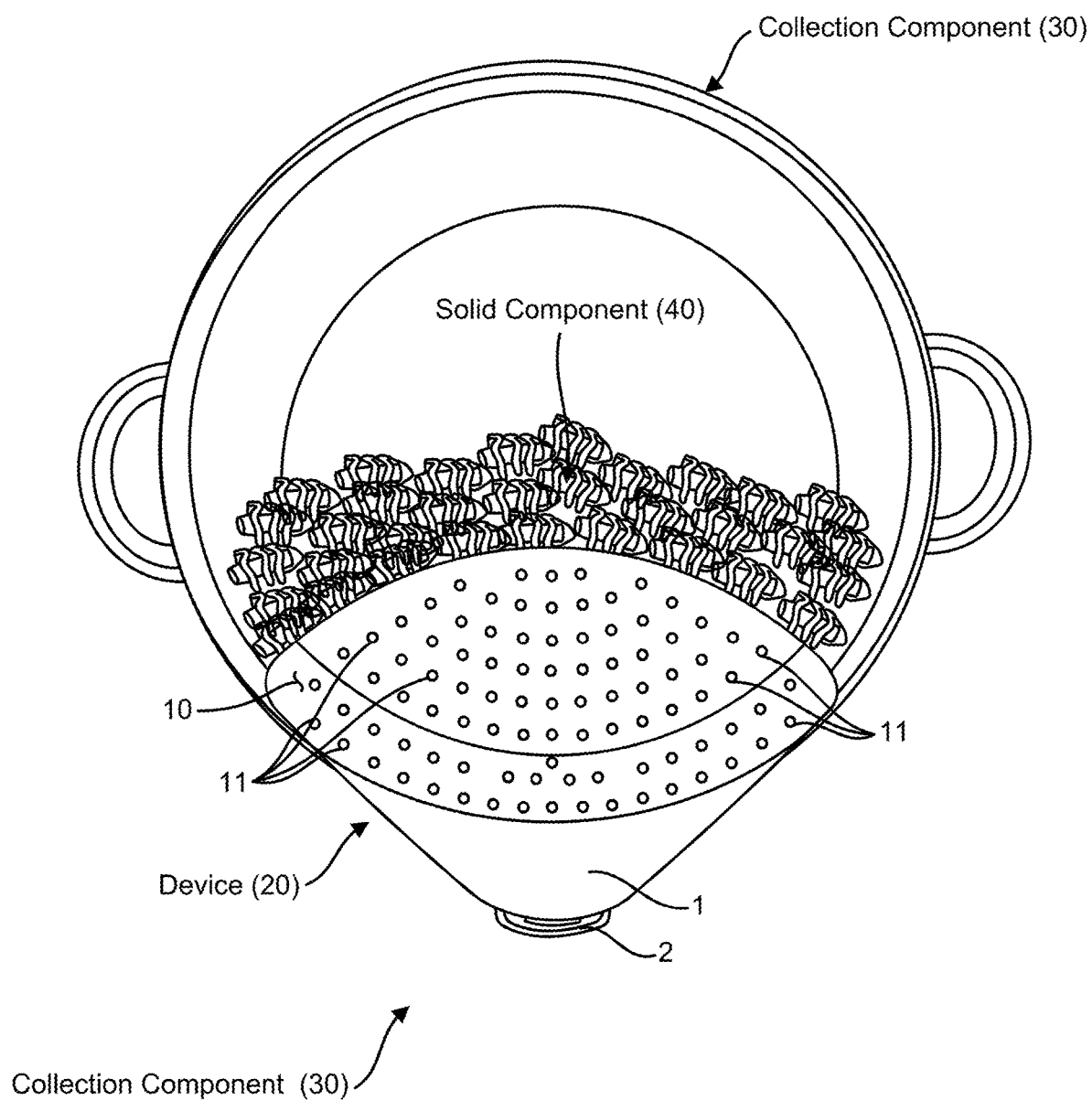

In one aspect, the present invention relates to a device for separating a solid component (e.g., a solid food product) from a liquid. In one embodiment, the device comprises a strainer component coupled to an attachment component, where the strainer component comprises a surface having a plurality of holes effective to allow the liquid to pass through the surface while retaining the solid component, and where the attachment component is effective to secure the strainer component in place over a collection component (e.g., a pot, a pan, a bowl, and the like) (see FIGS. 1A-1B). As used herein, a collection component refers to any type of container that can hold a liquid, a solid component, or a mixture comprising a solid component mixed with a liquid. The device of the present invention can be used for separating solid food products such as fruits, vegetables, pasta, meats, starches (e.g., potatoes), and the like, from liquids. FIG. 1A shows three illustrative examples of device 20 attached to collection component 30. FIG. 1B shows an example of device 20 attached to collection component 30 with solid component 40 being retained in collection component 30 after having passed the liquid through the holes of the strainer component of device 20.

Figure 2A:
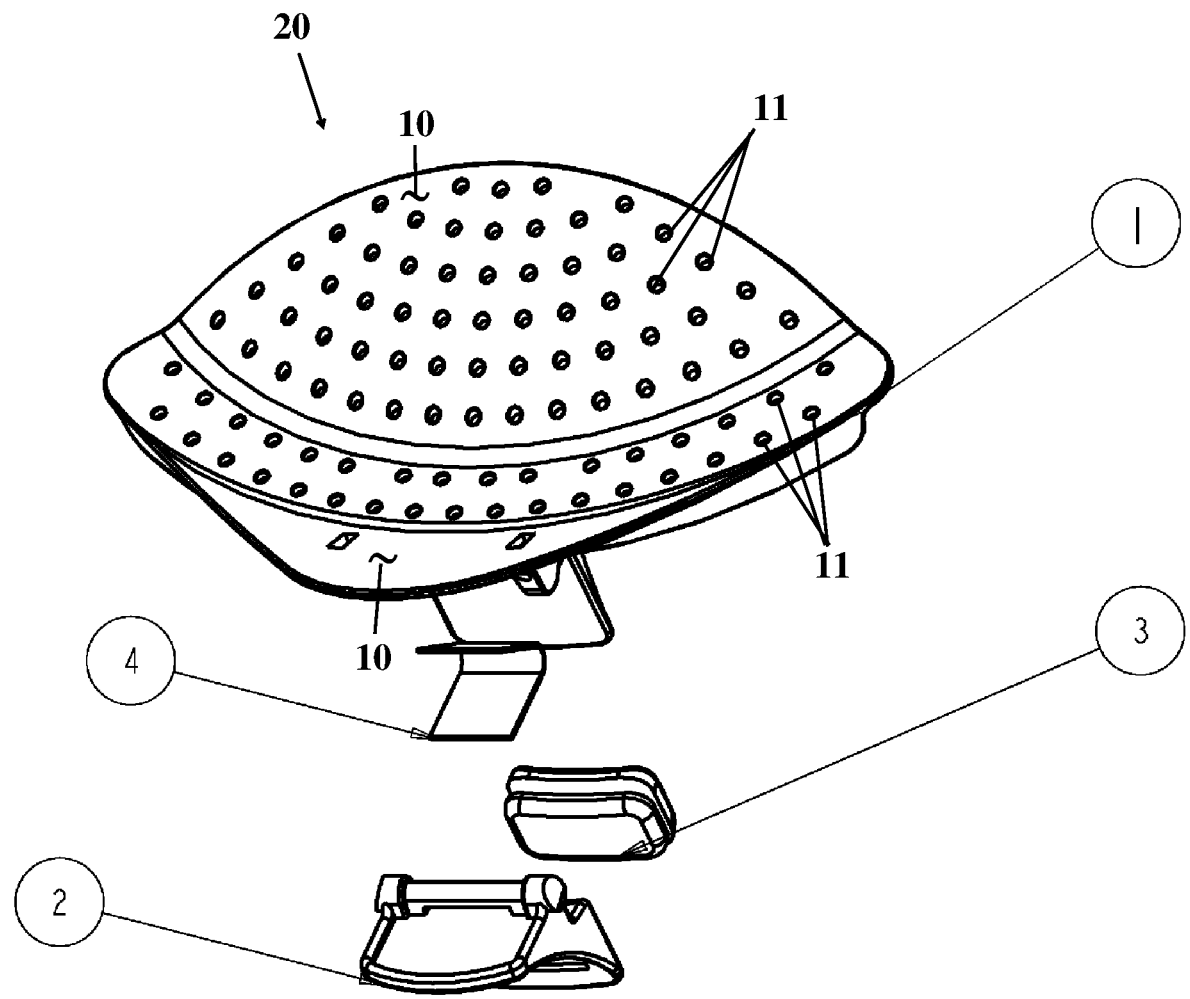
FIGS. 2A-2B show illustrations of one embodiment of the device of the present invention.
Figure 2B:
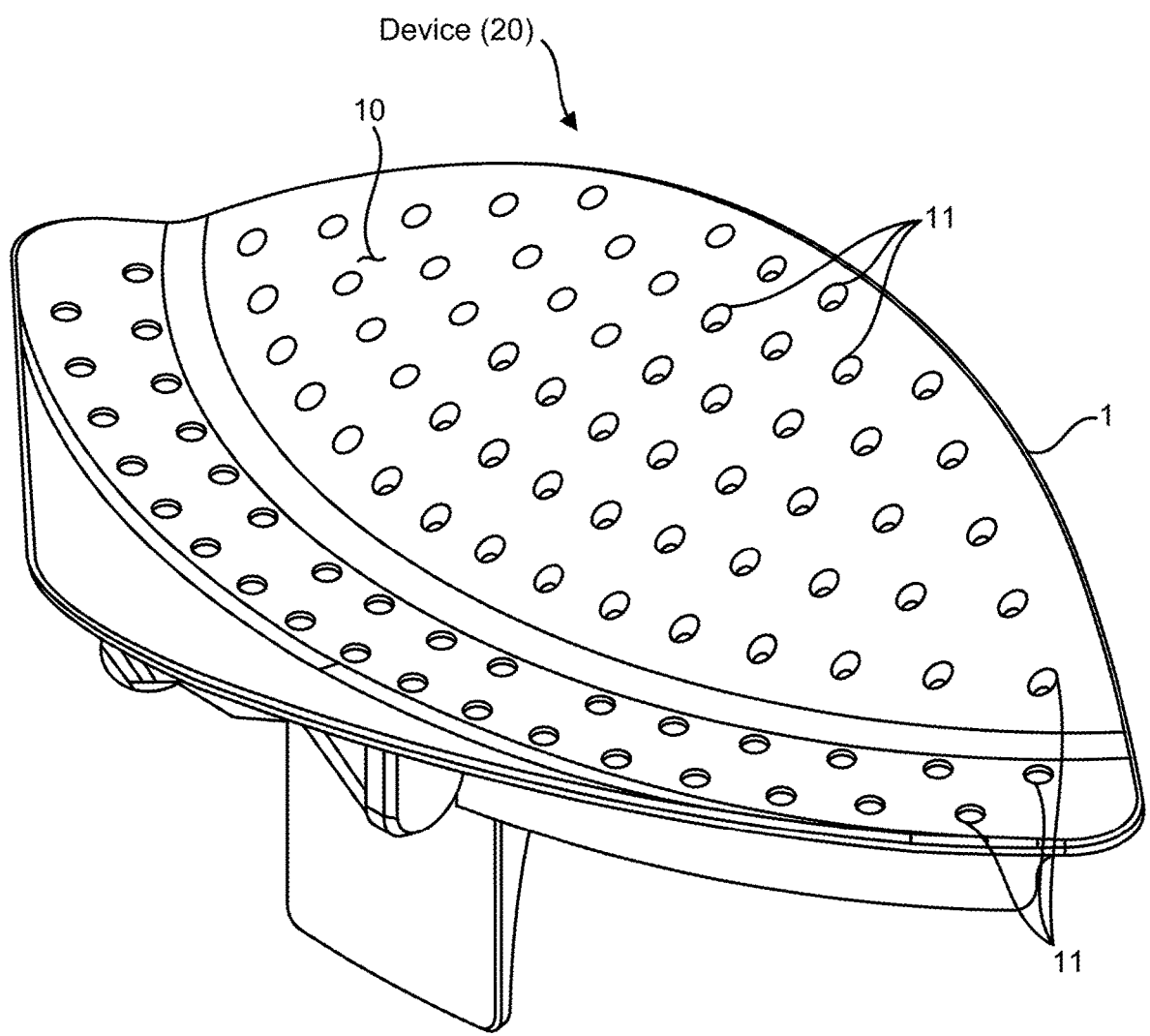
Figure 3A:
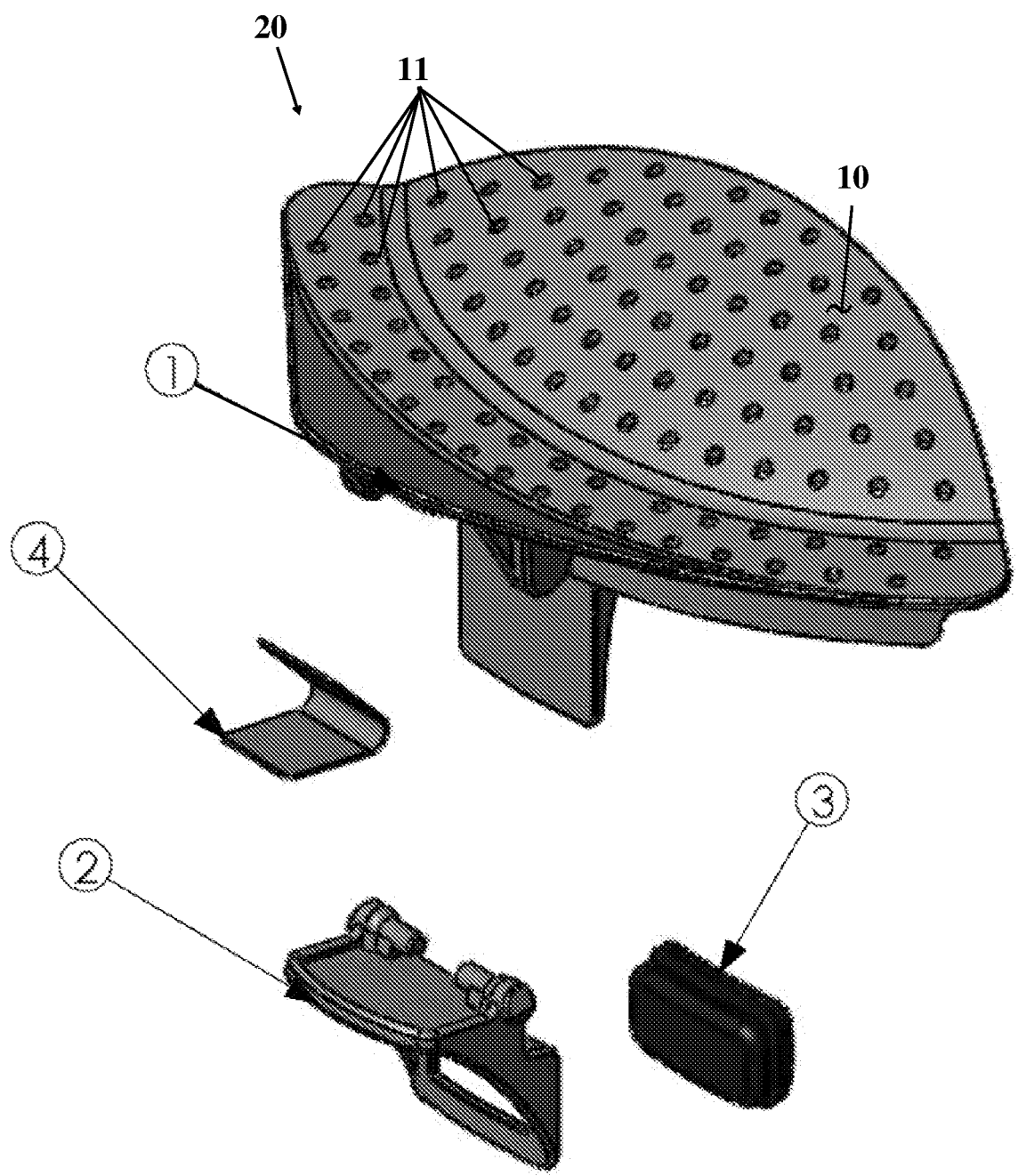
FIGS. 3A-3B show illustrations of one embodiment of the device of the present invention.
Figure 3B:
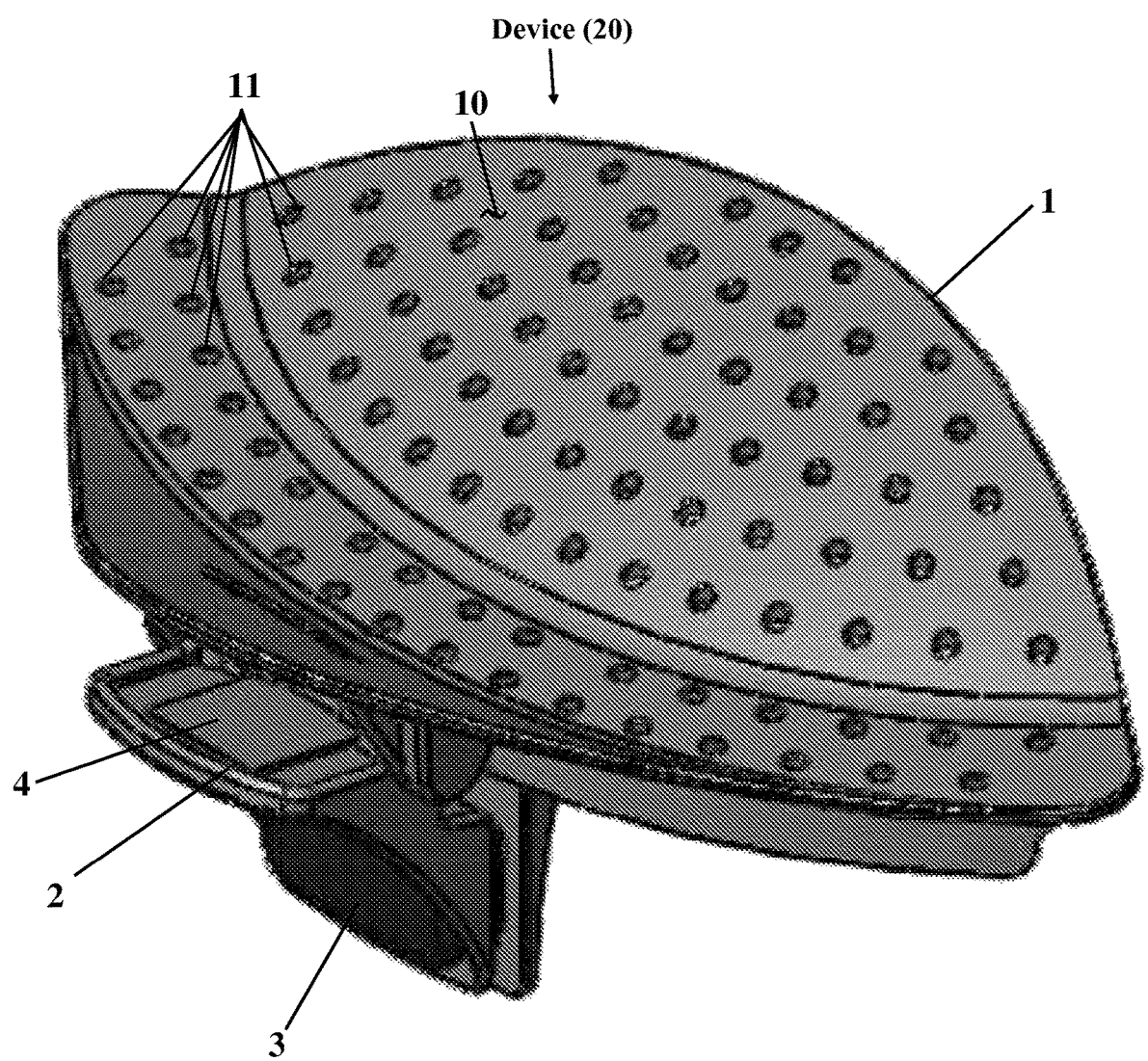
Figure 4A:
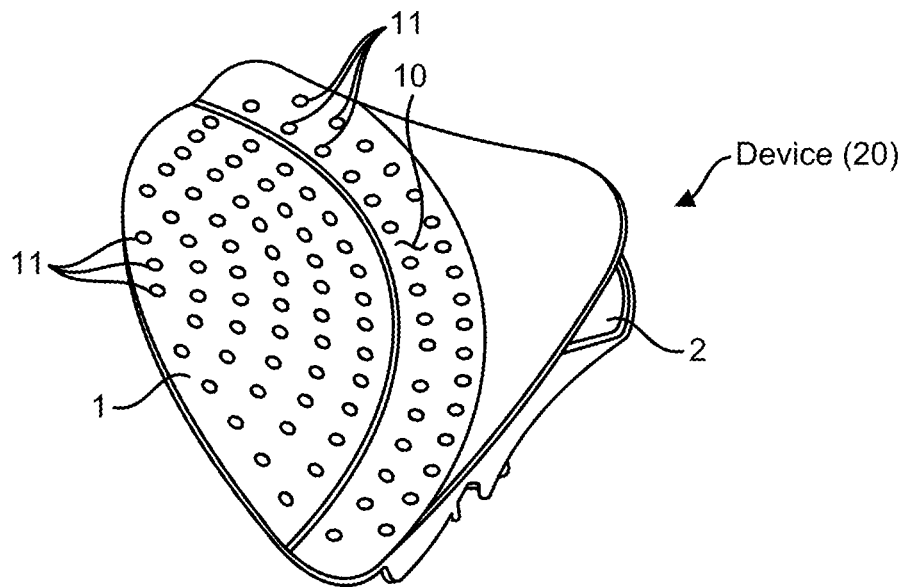
FIGS. 4A-4F show illustrations of various views of one embodiment of the device of the present invention.
Figure 4B:
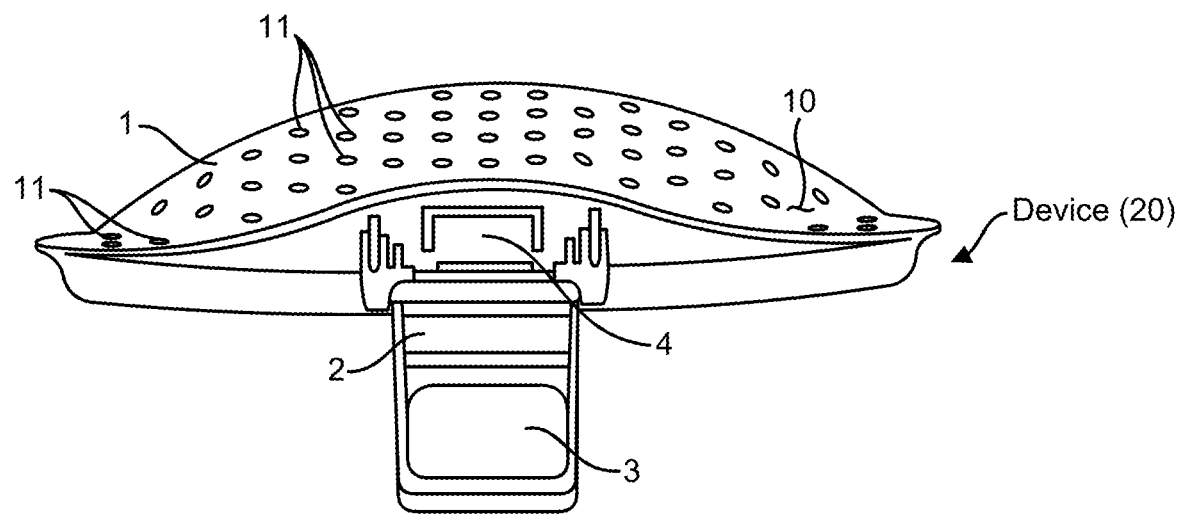
Figure 4C:
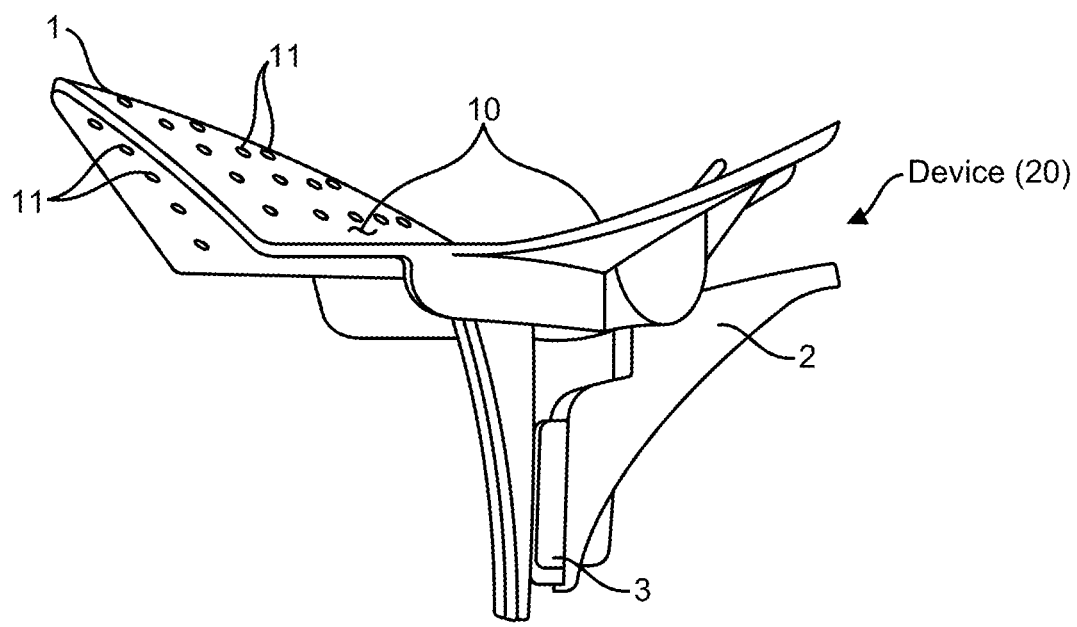
Figure 4D:
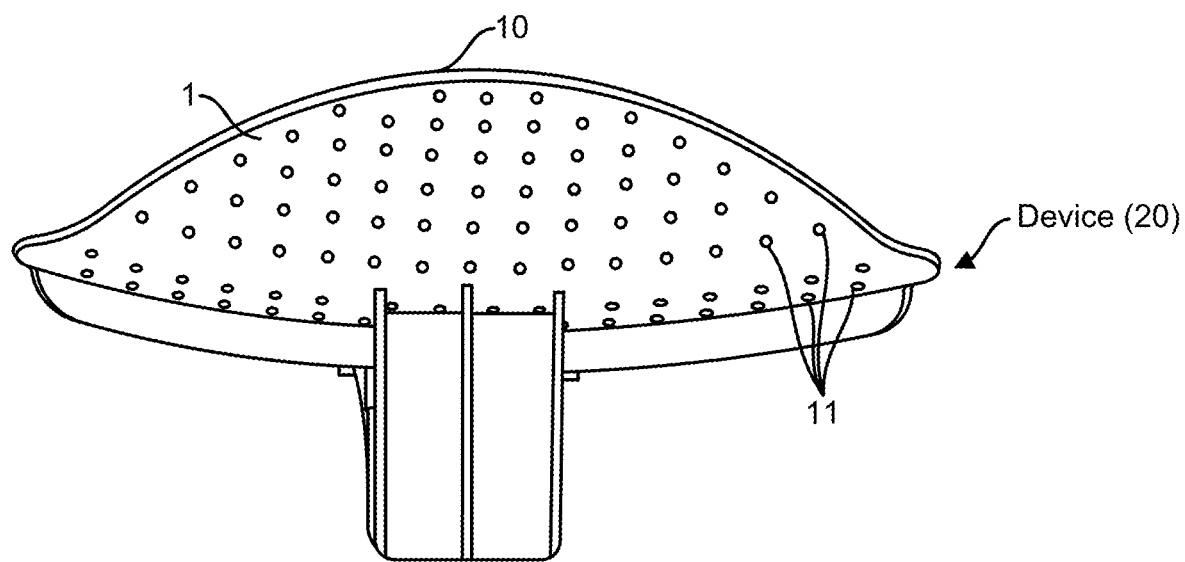
Figure 4E:
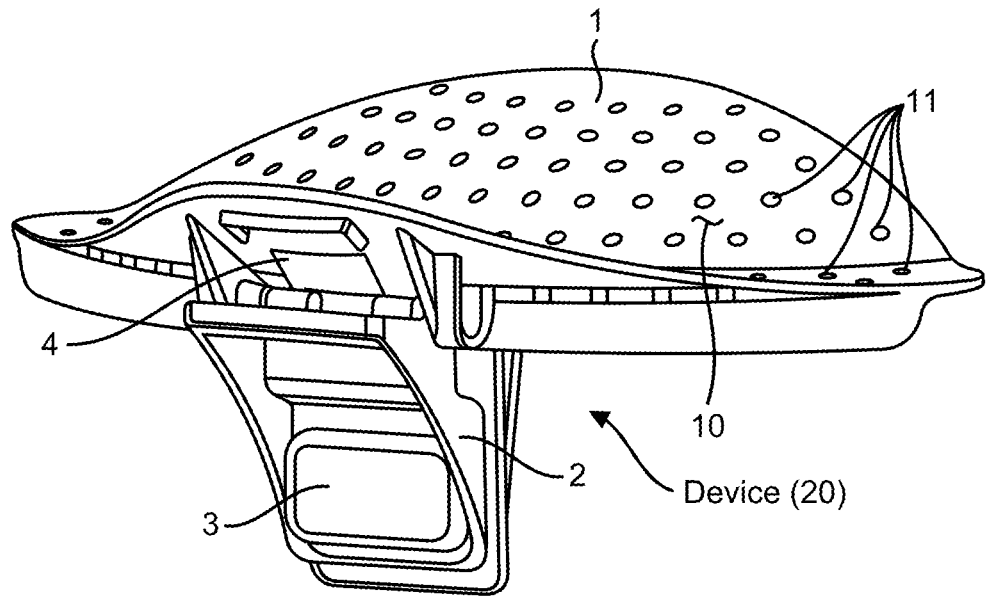
Figure 4F:
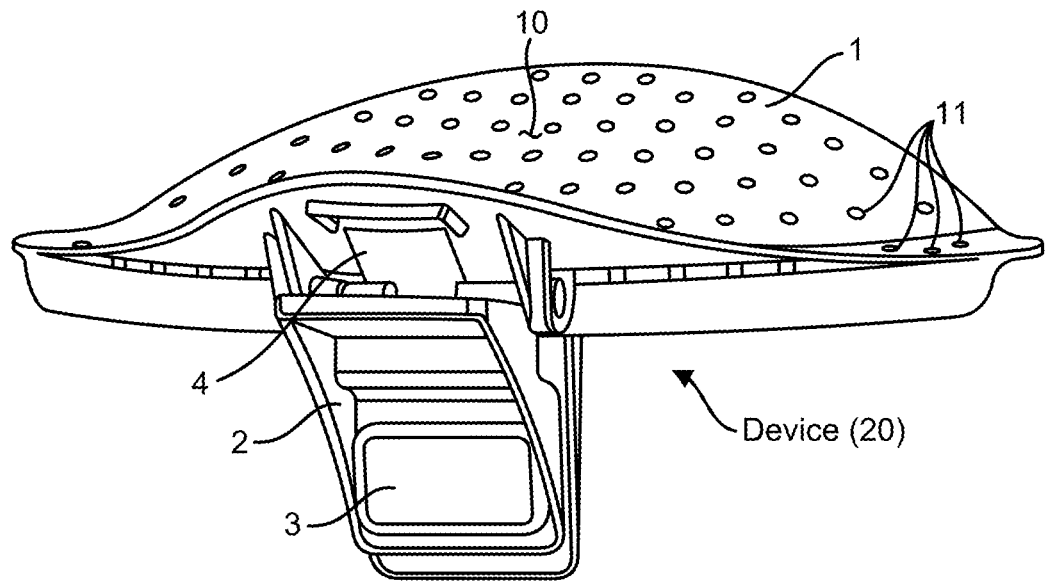
Figure 5:
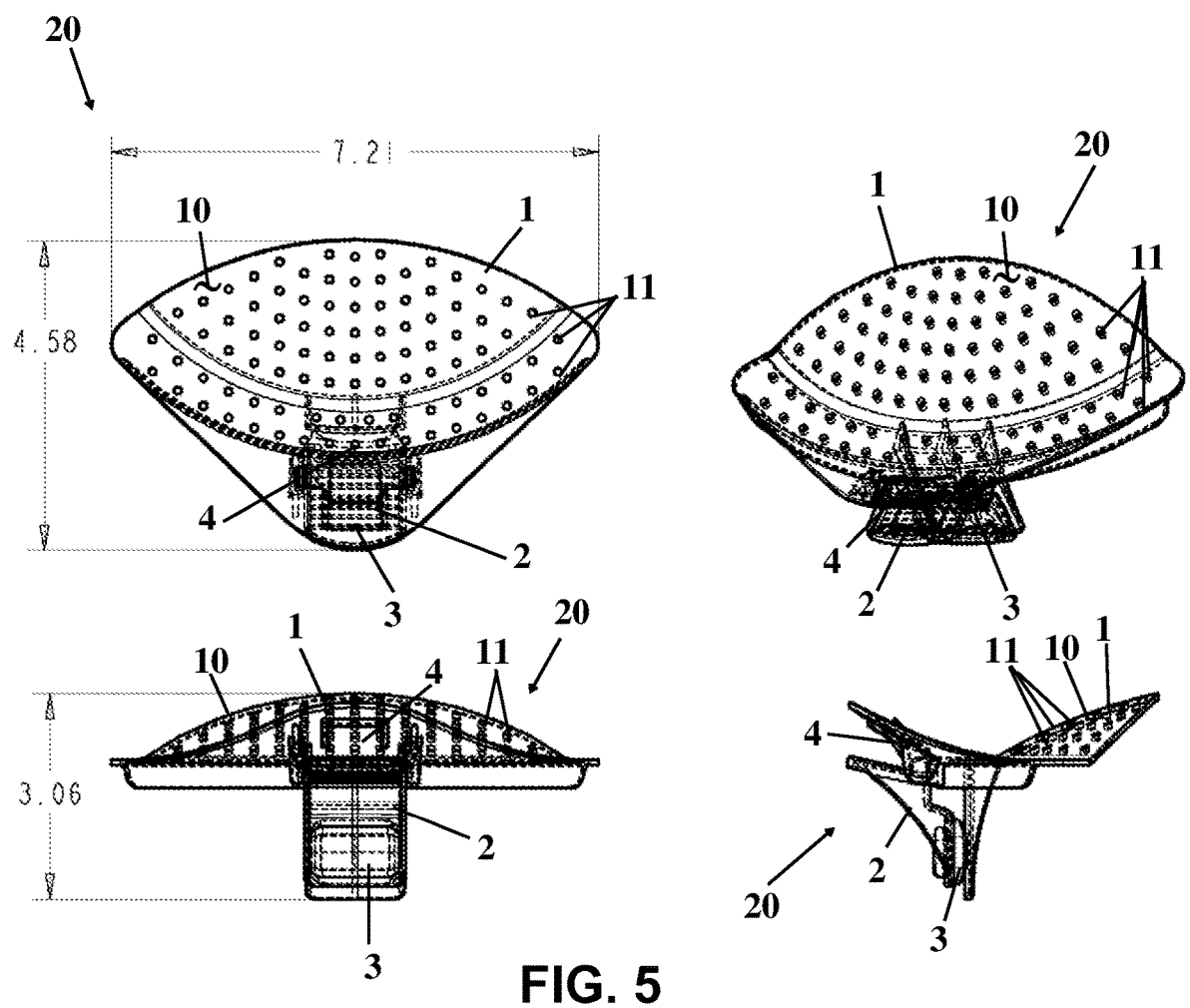
FIG. 5 shows illustrations of various views of one embodiment of the device of the present invention.
Figure 6A:
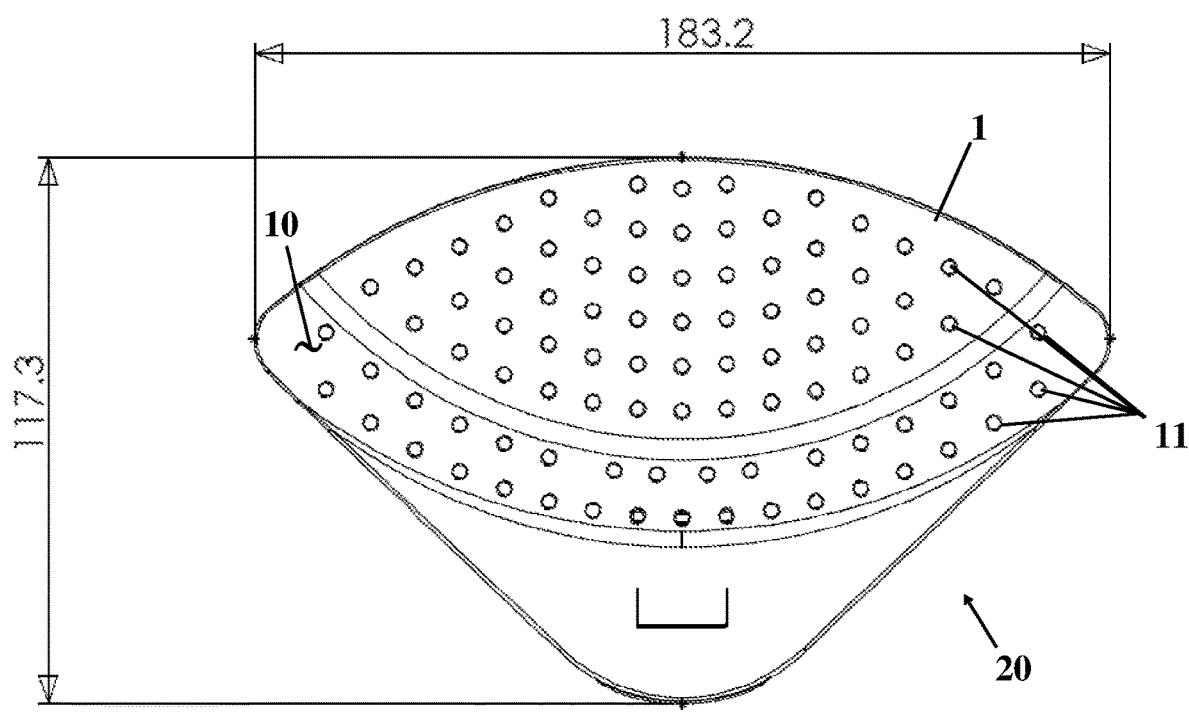
FIGS. 6A-6D show illustrations of various views of one embodiment of the device of the present invention.
Figure 6B:
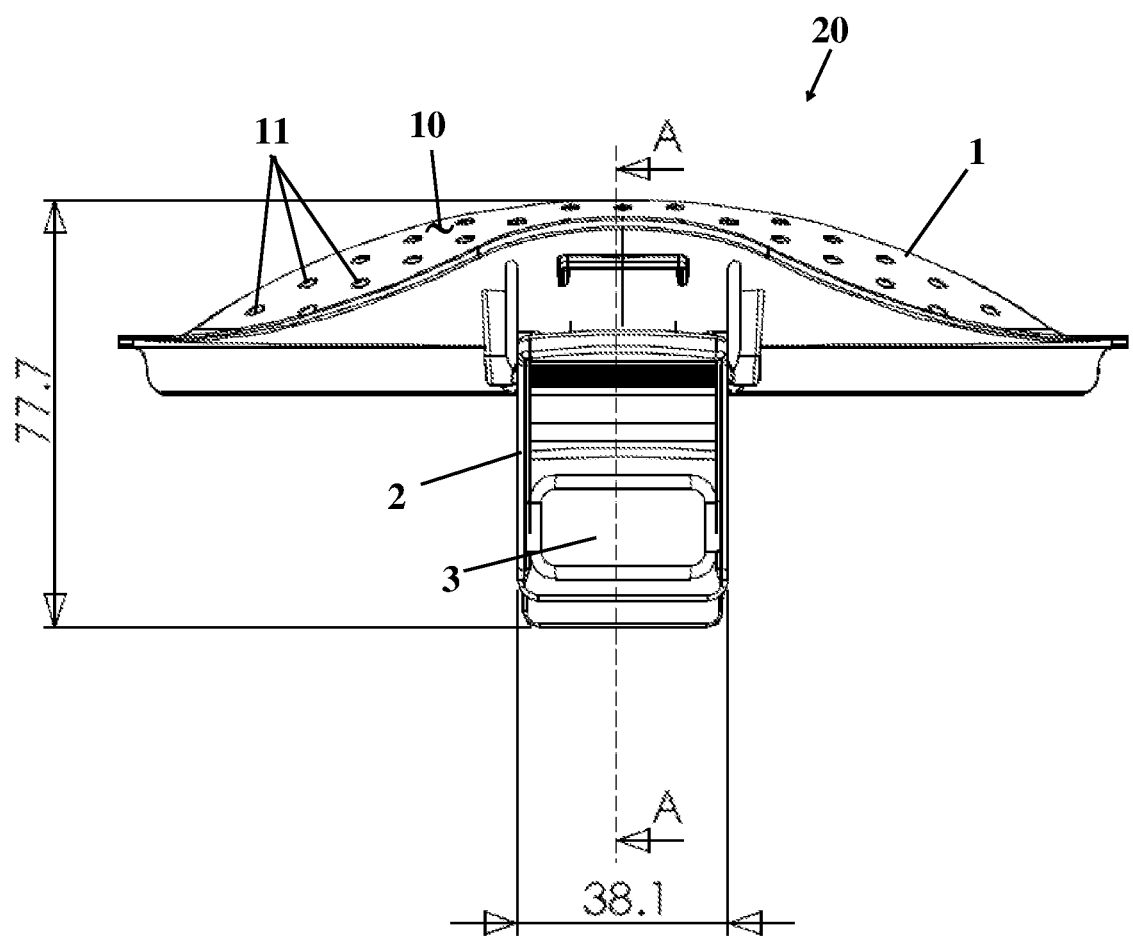
Figure 6C:
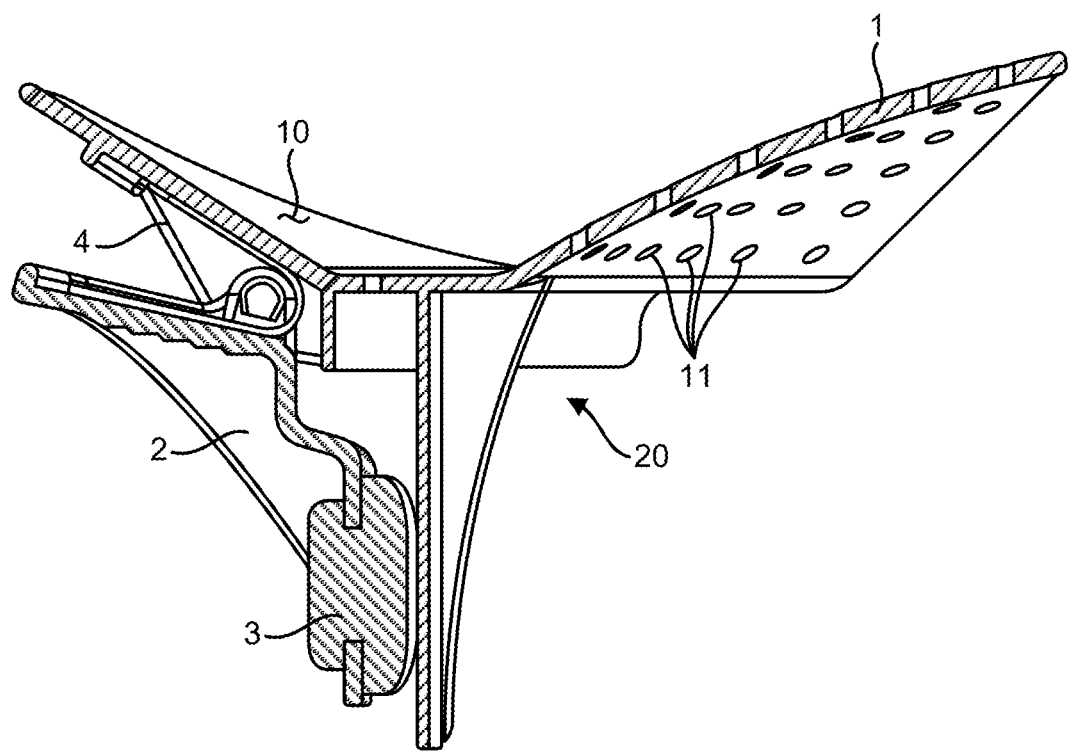
Figure 6D:
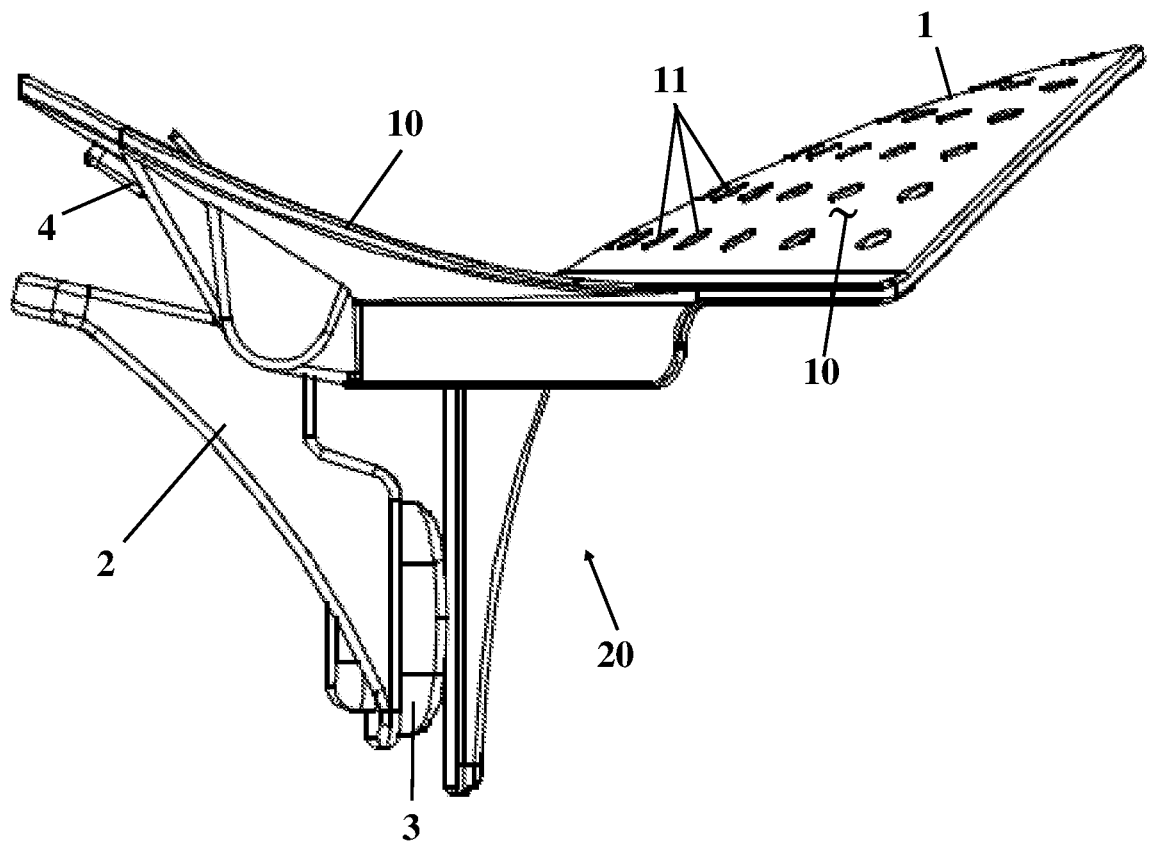
Figure 7:
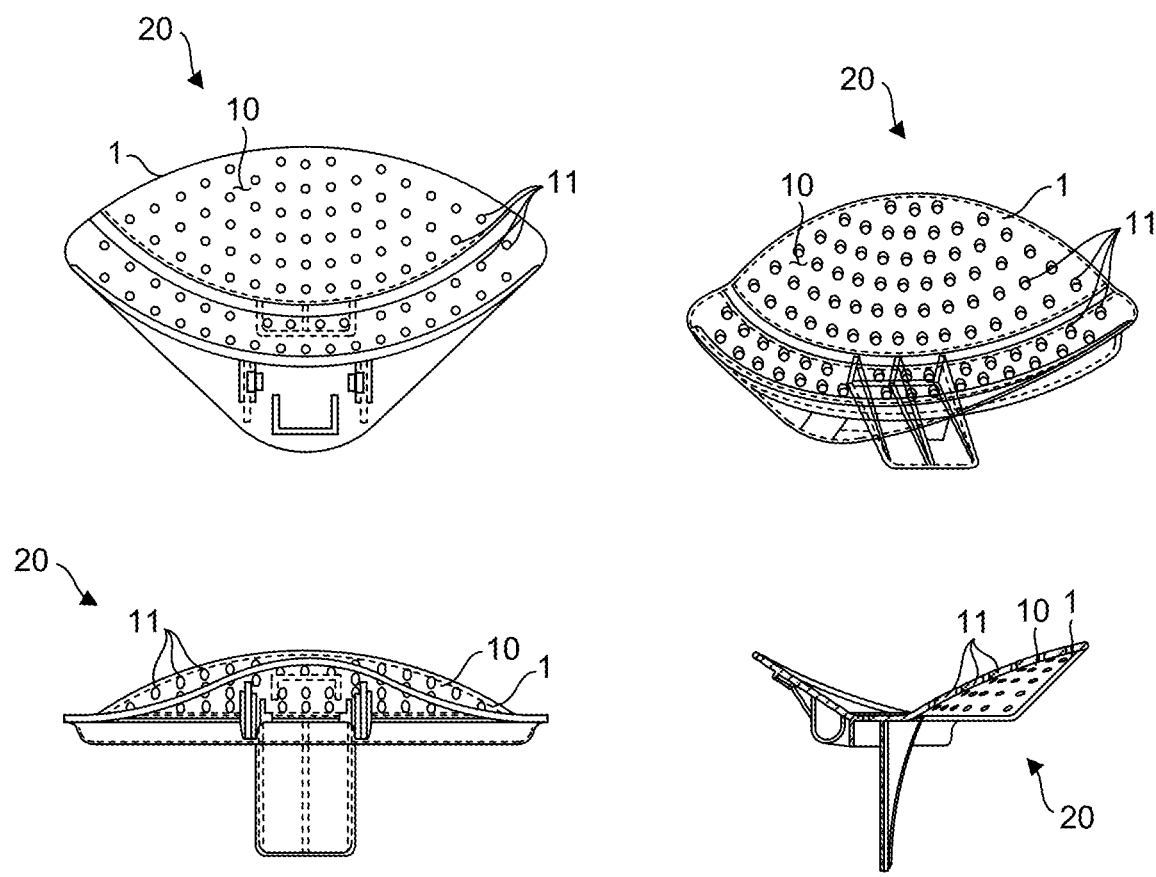
FIG. 7 shows illustrations of various views of one embodiment of the strainer component of a device of the present invention.
Figure 8A:
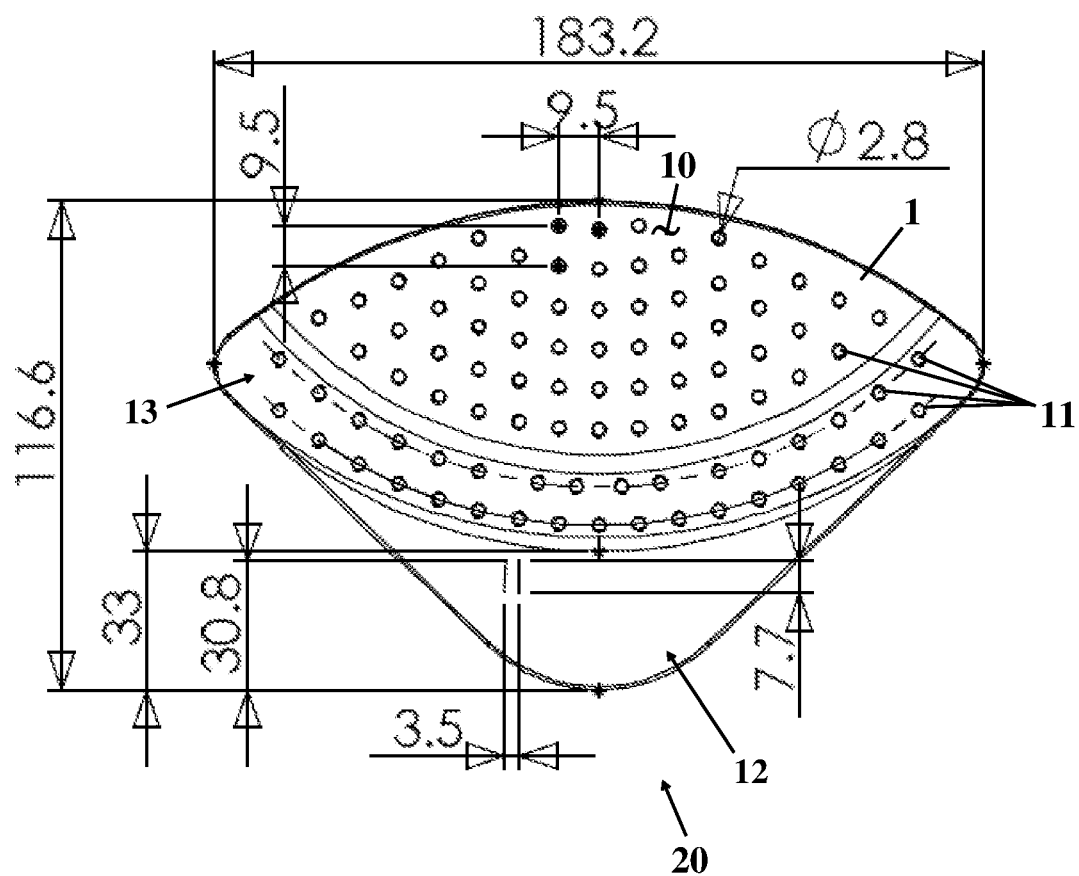
FIGS. 8A-8H show illustrations of various views of embodiments and aspects of a strainer component of a device of the present invention.
Figure 8B:
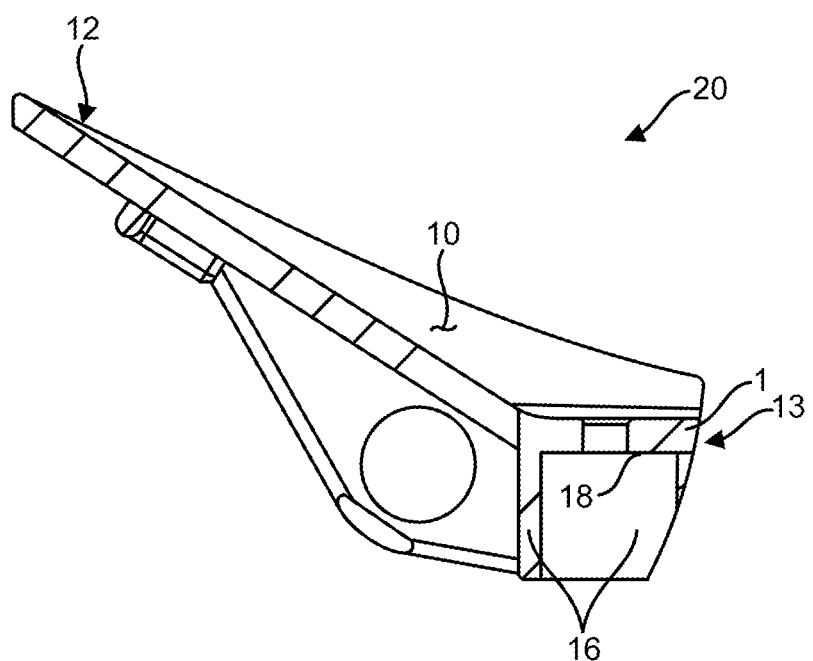
Figure 8C:
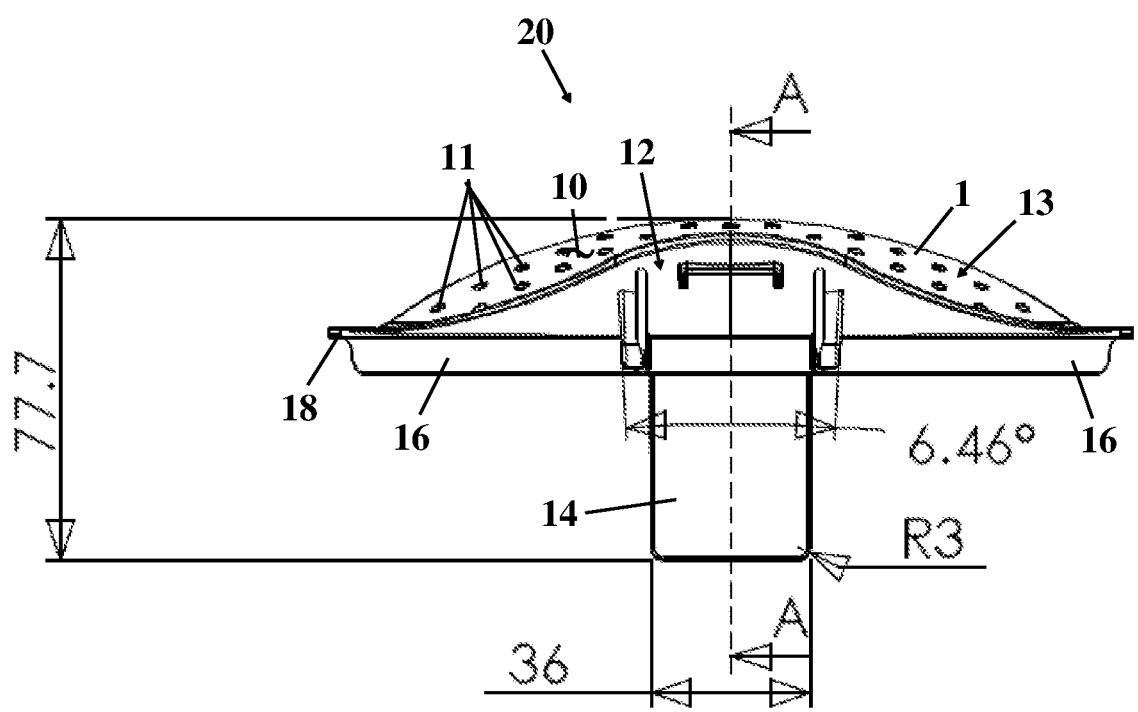
Figure 8D:
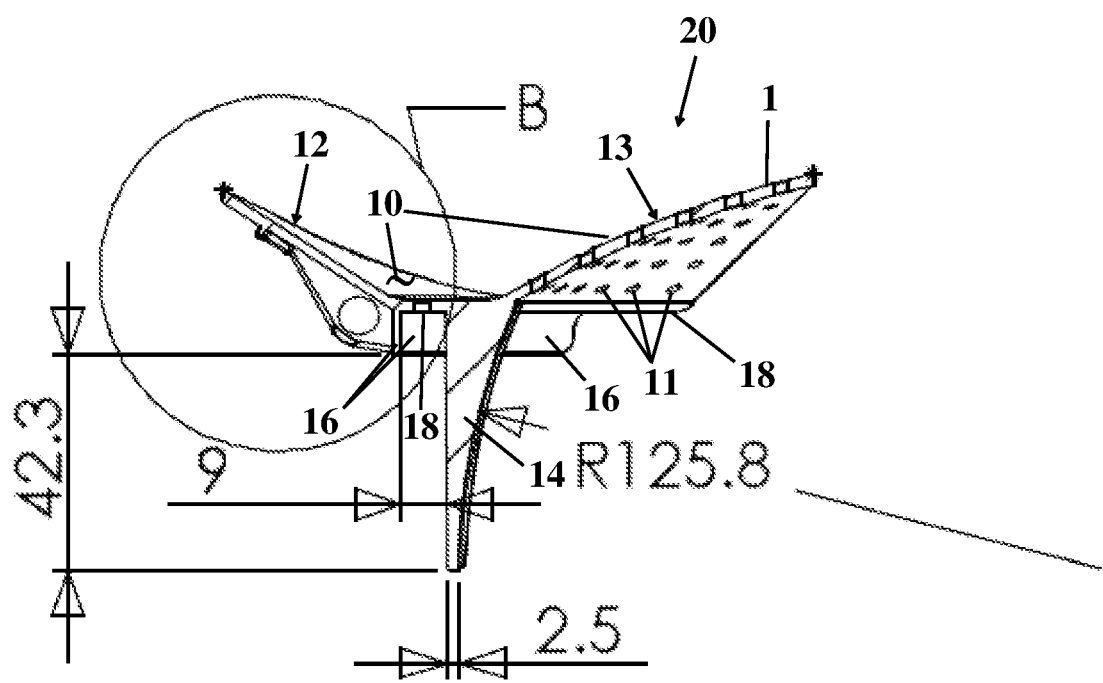
Figure 8E:
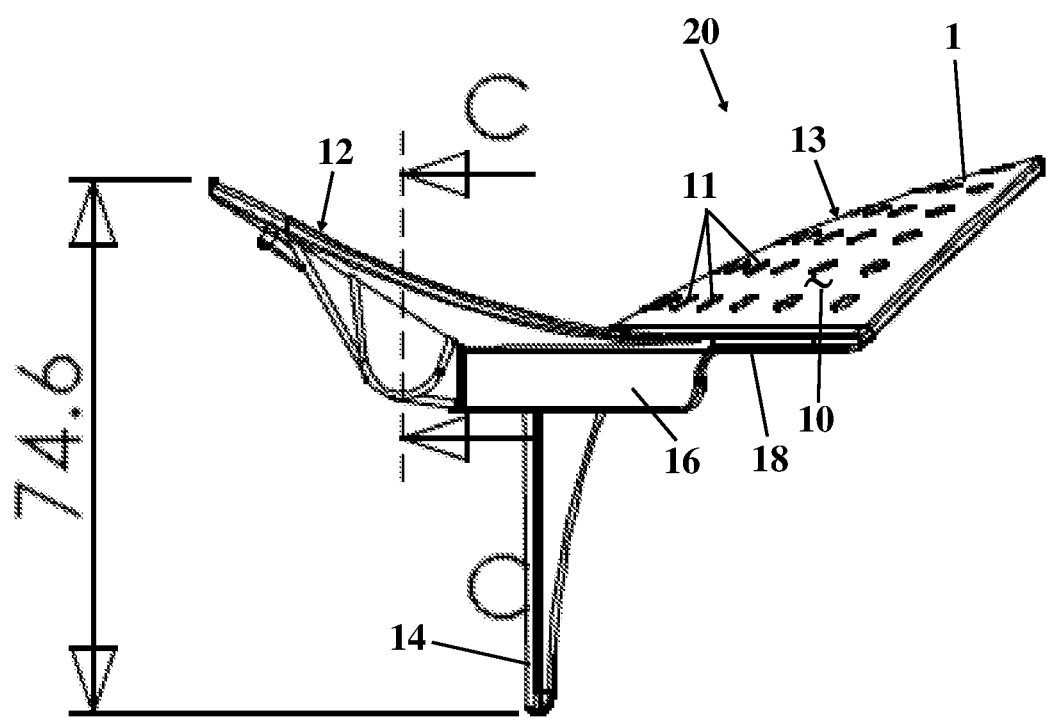
Figure 8F:
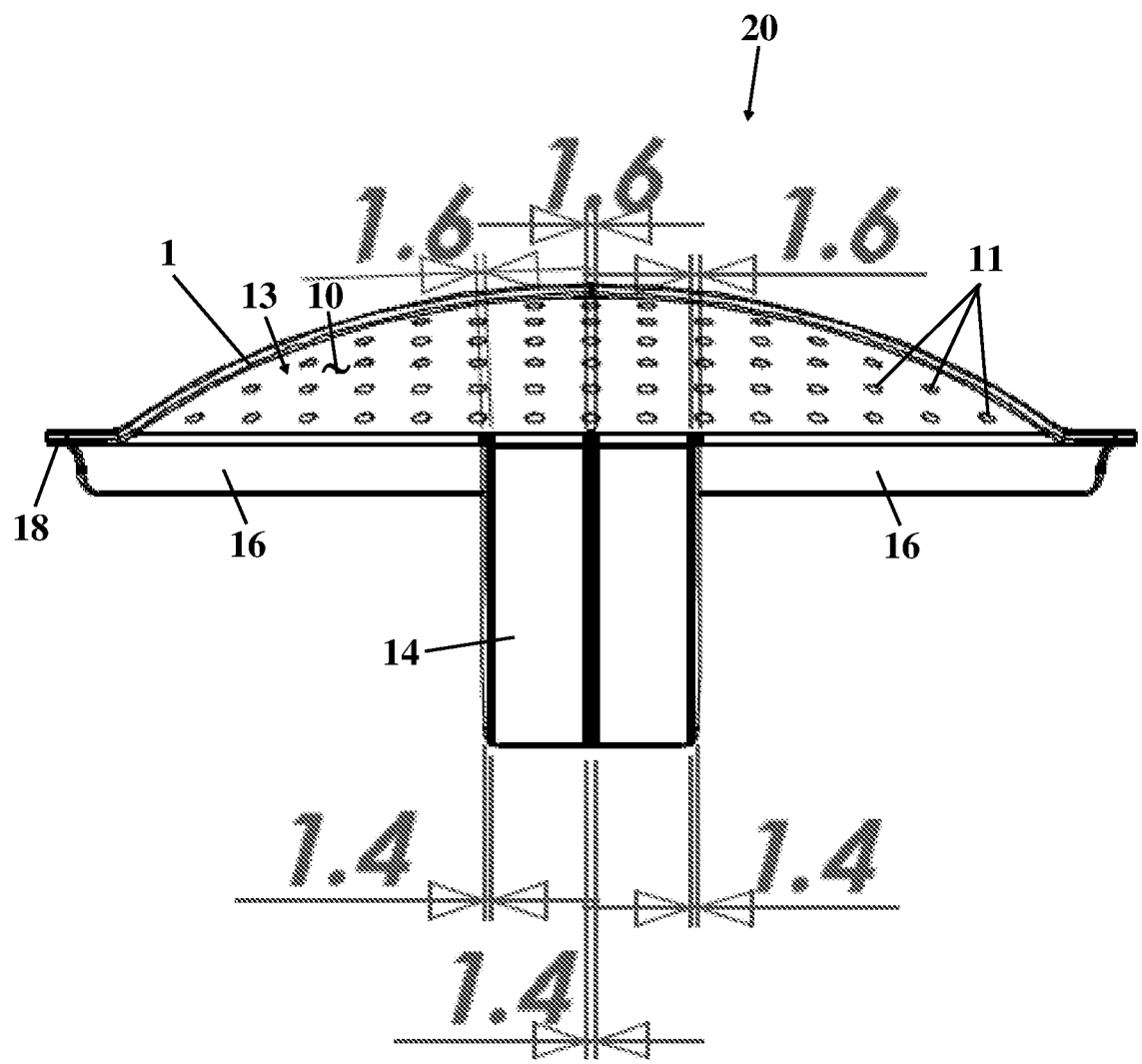
Figure 8G:
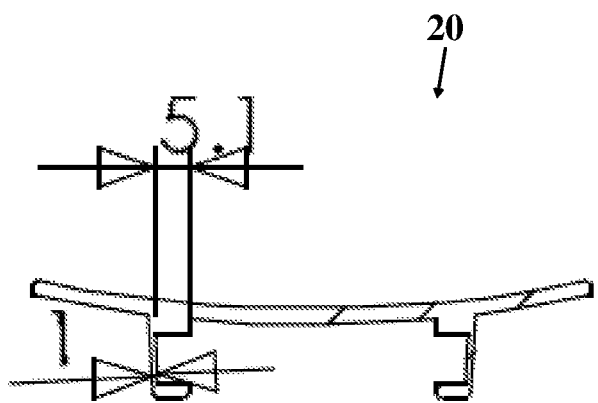
Figure 8H:
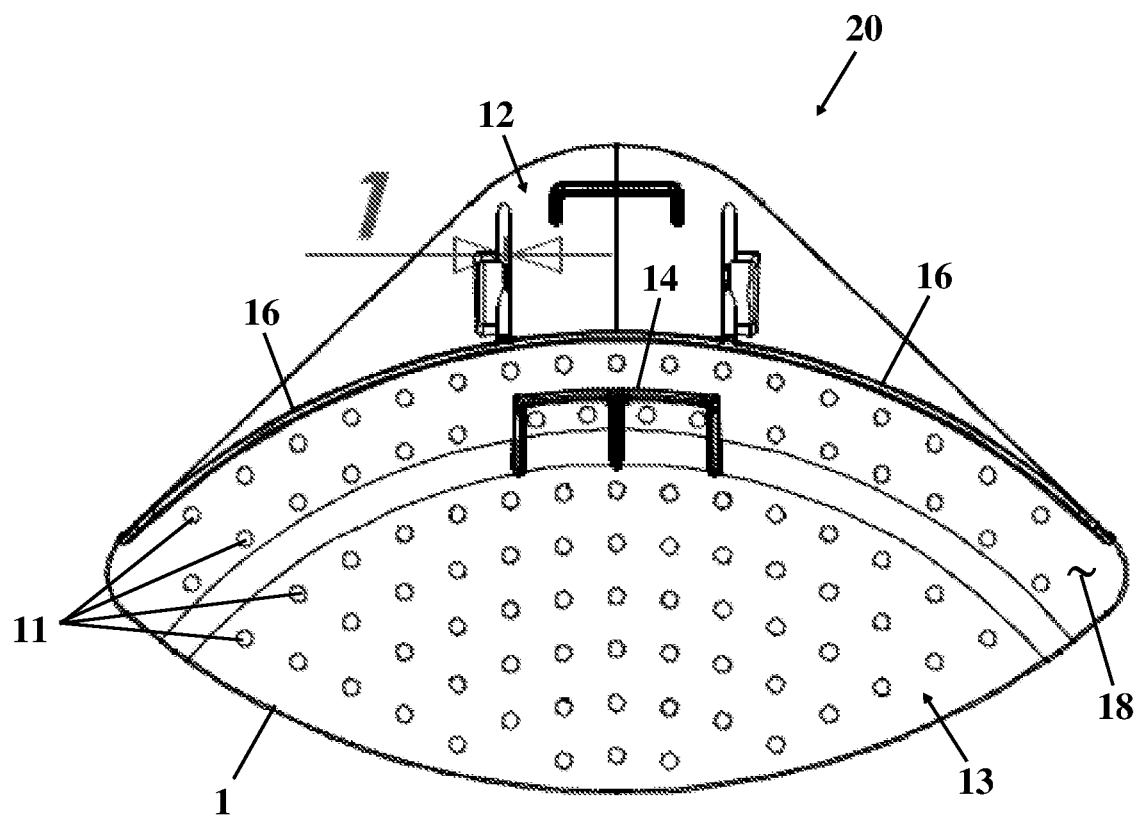
Figure 9:
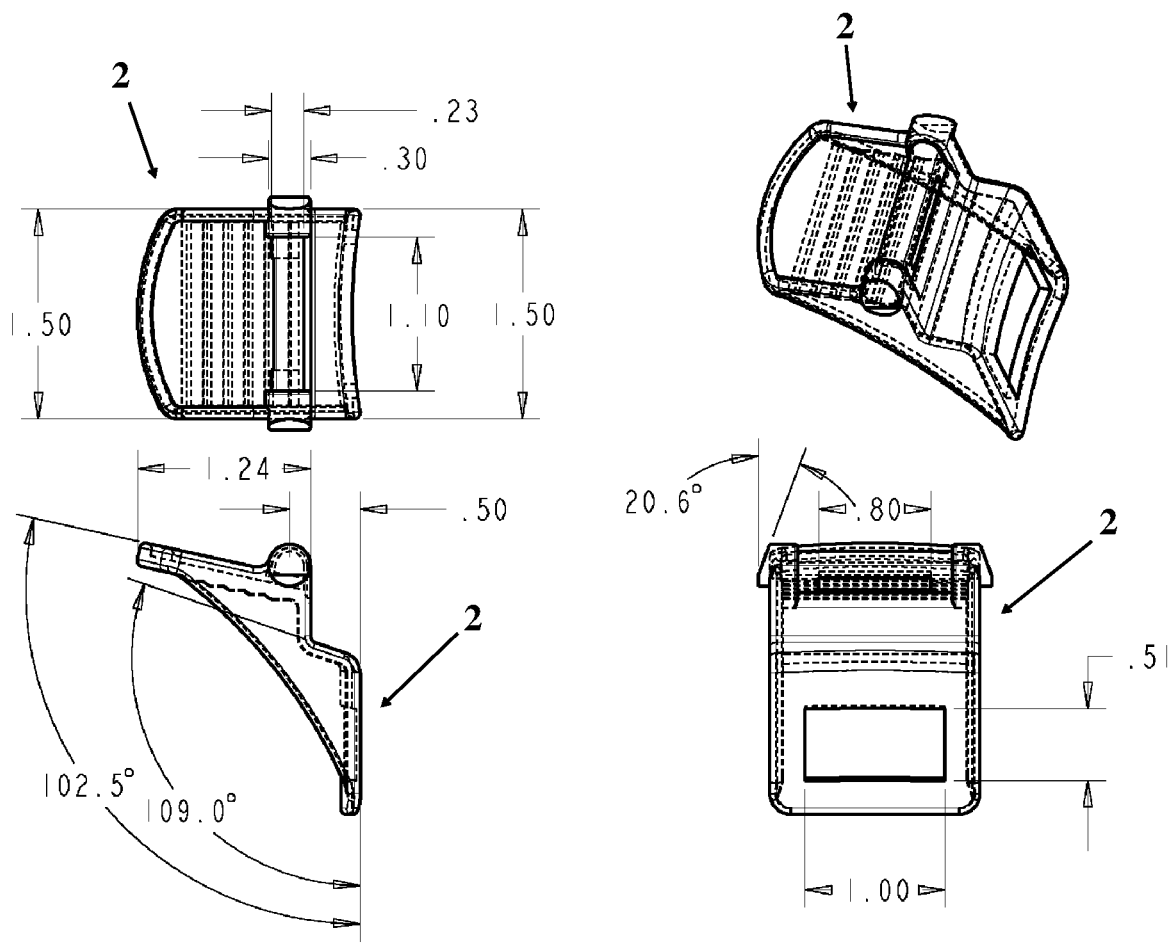
FIG. 9 shows illustrations of various views of embodiments and aspects of a lever component of a device of the present invention.
Figure 10A:
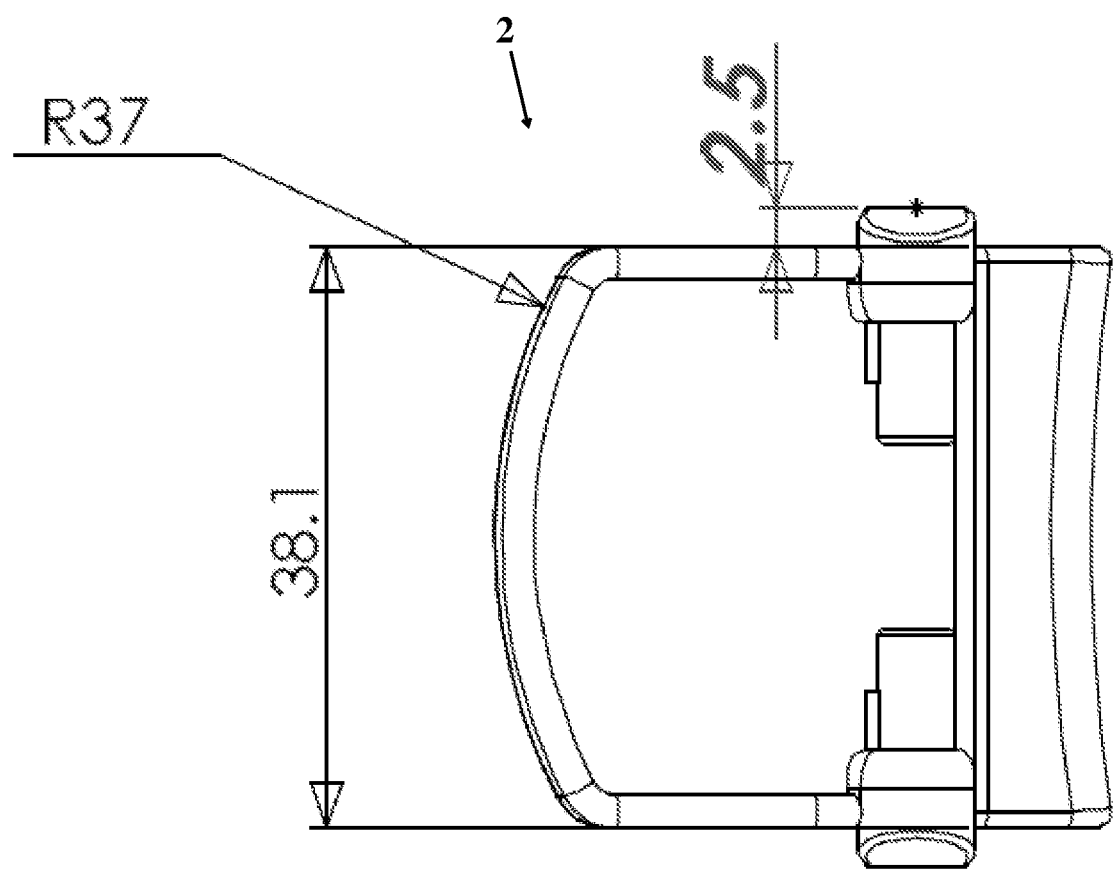
FIGS. 10A-10F show illustrations of various views of embodiments and aspects of a lever component of a device of the present invention.
Figure 10B:
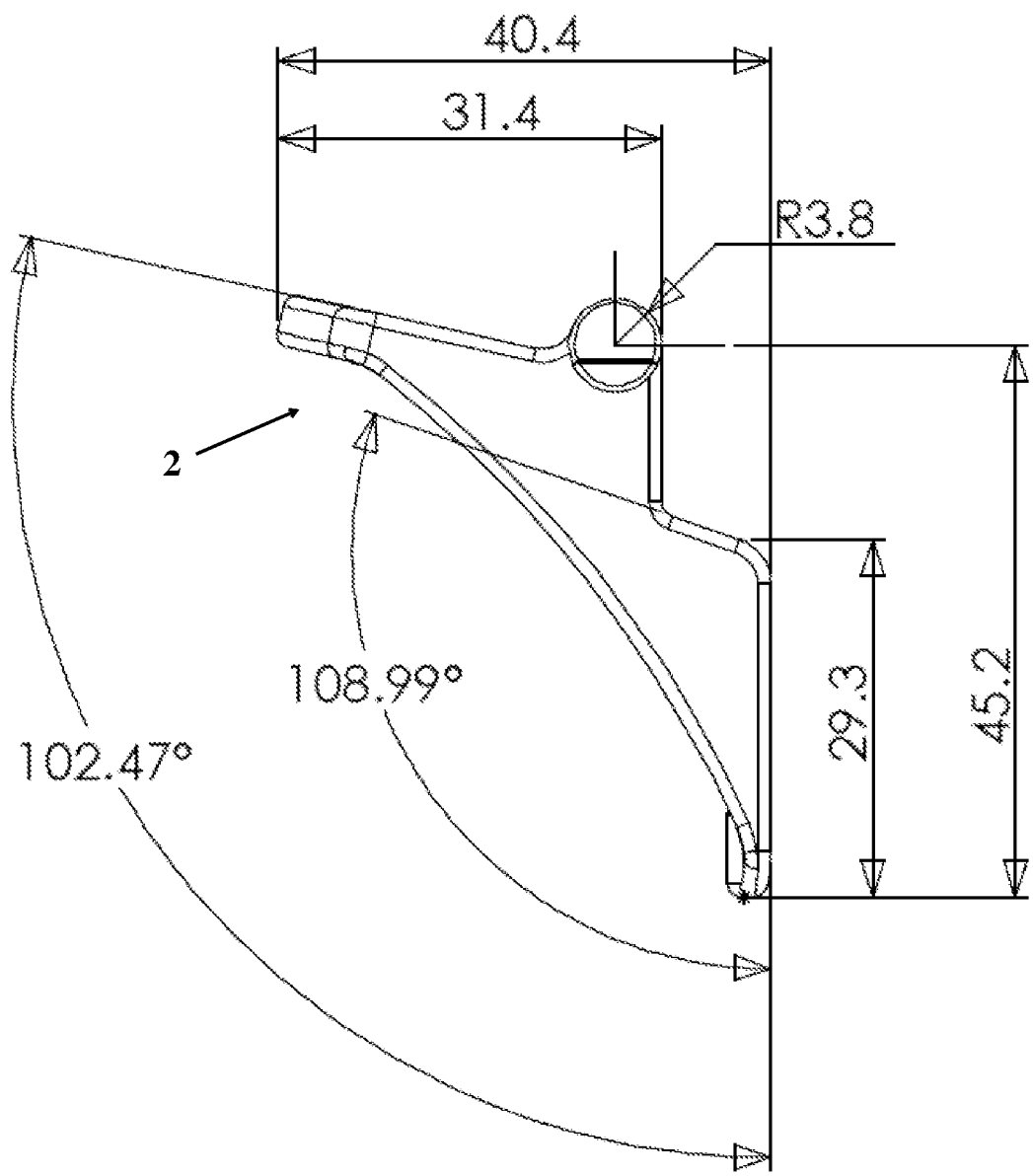
Figure 10C:
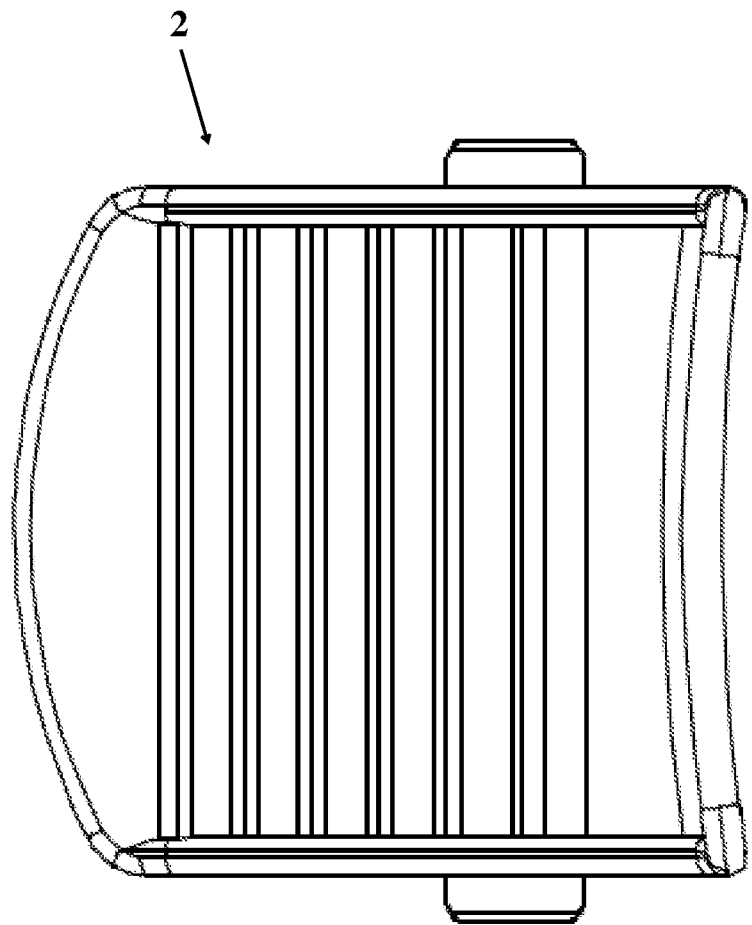
Figure 10D:
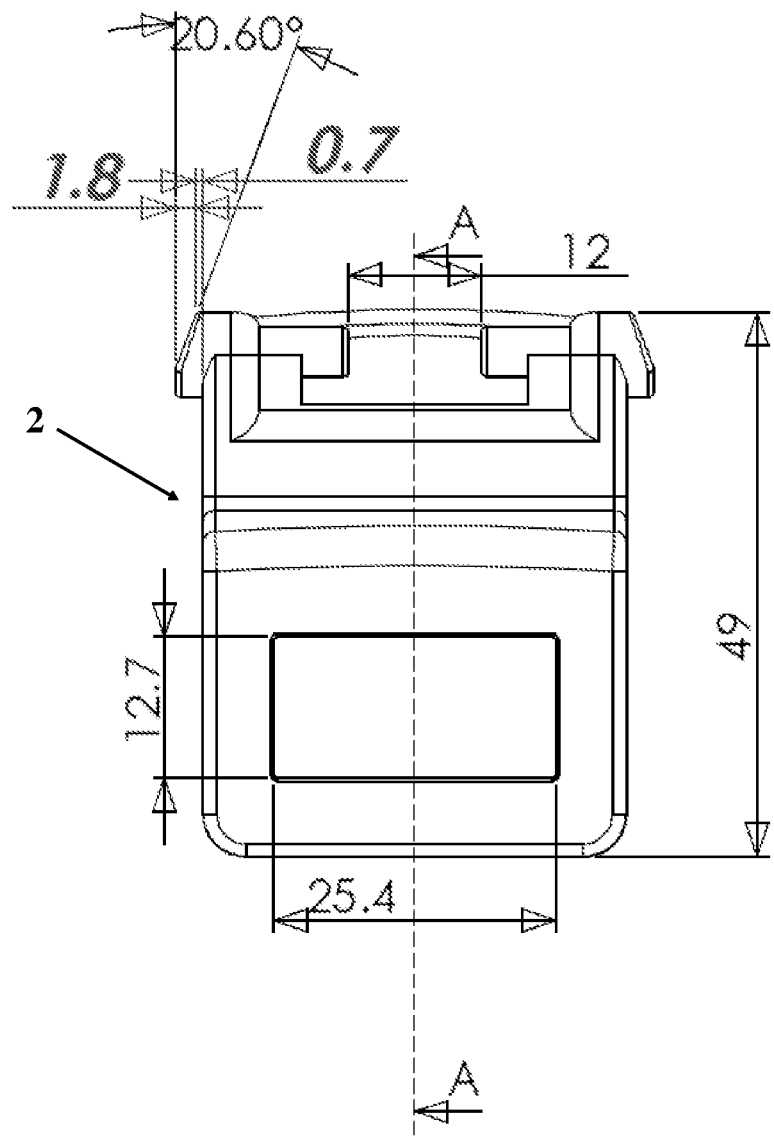
Figure 10E:
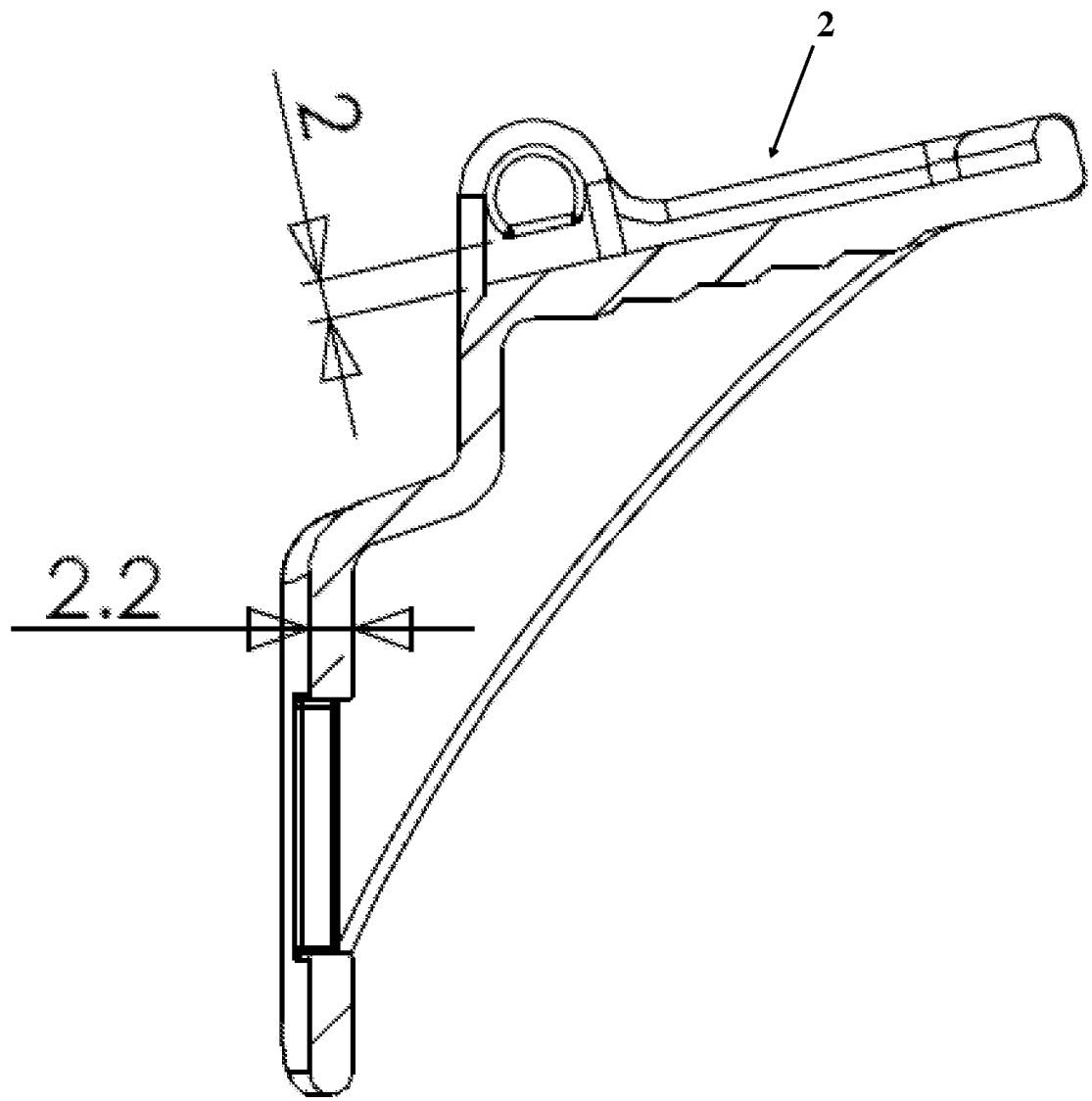
Figure 10F:
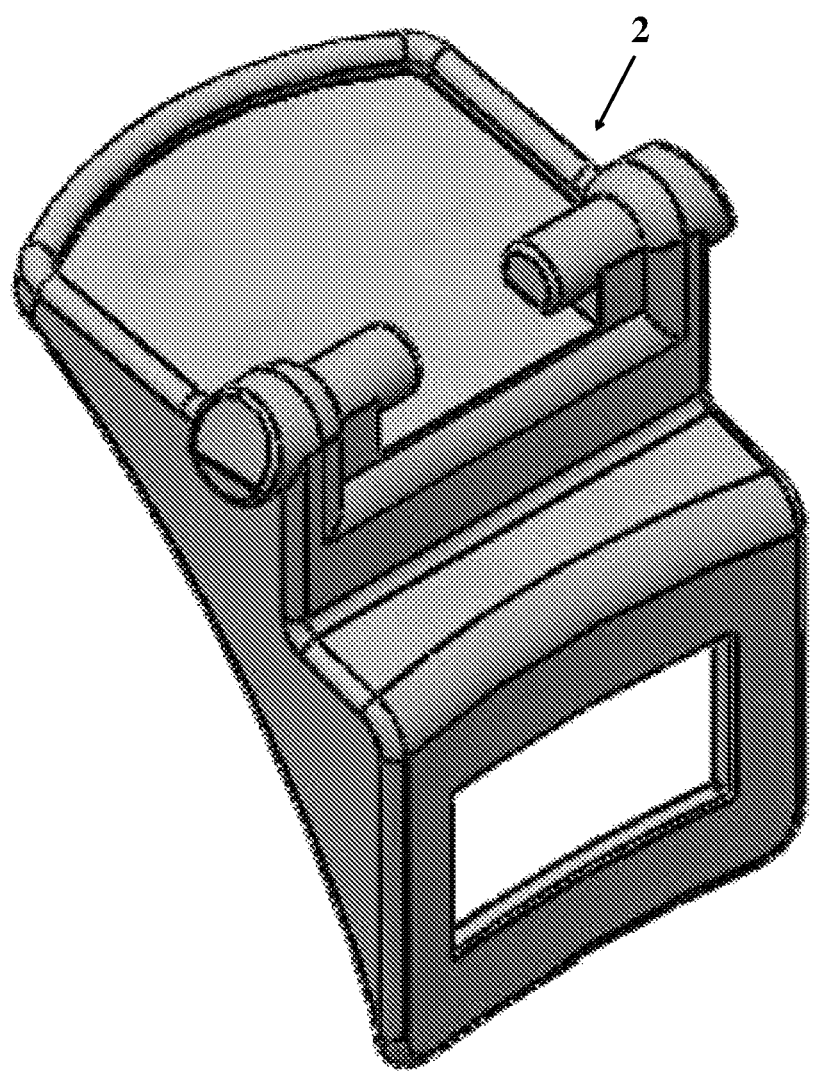

As used herein, in a particular embodiment, the attachment component includes the lever component, grip component, and spring component. FIGS. 2A, 2B, 3A, and 3B illustrate the various components of such an embodiment of a device of the present invention. As shown in FIGS. 2A and 3A, the device can include strainer component 1, lever component 2, grip component 3, and spring component 4. FIGS. 2B, 3B and FIGS. 4A-4F show the components assembled together to form the device 20 of the present invention. FIGS. 5 and 6A-6D also depict various embodiments of the device of the present invention and its component parts. As clearly depicted, for example, in FIGS. 4A, 4F, and 6A-6D, the surface of the strainer component has an upwardly projecting tapered end.

The strainer component, lever component, grip component, and spring component can be made of any material known by those of ordinary skill in the art for use in making each such component. For example, the strainer component and the lever component can be made of any material suitable for injection molding, including, without limitation, such materials as plastics, nylon, and the like. The grip component can be made of any material suitable for use in facilitating gripping action of the attachment component to a collection component, including, without limitation, such materials as silicone and the like. The spring component can be made of any material suitable for use as a spring for opening and closing the lever (e.g., clip) about a rim of a collection component, including, without limitation, such materials as stainless spring steel, stainless steel (reinforced), and the like.

FIGS. 7 and 8A-8H illustrate various views of certain embodiments of a strainer component of the present invention. As shown in FIGS. 8A-8F and 8H, the strainer component 1 may include a top surface 10 and a bottom surface 18, an attachment component provided at the bottom surface 18 of the strainer component 1, a curved wall 16 extending from the bottom surface 18 of the strainer component 1, and an attachment projection 14 extending from the bottom surface 18 of the strainer component 1. The attachment component may extend further from the bottom surface 18 of the strainer component 1 than the curved wall 16. The curved wall 16 may be positioned between the attachment component and the attachment projection 14 at the bottom surface 18, and the curved wall 16 may be spaced from the attachment projection 14, as shown in 8B-8F and 8H. As shown in FIGS. 8A-8F and 8H, the strainer component 1 may include a strainer portion 13 having a plurality of holes 11 to allow liquid to pass through the strainer portion 13 from the bottom surface 18 to the top surface 10 thereof while retaining solid component, and may further include an upwardly projecting tapered end portion 12 to direct the liquid that passes through the strainer portion 13.

Figure 14A:
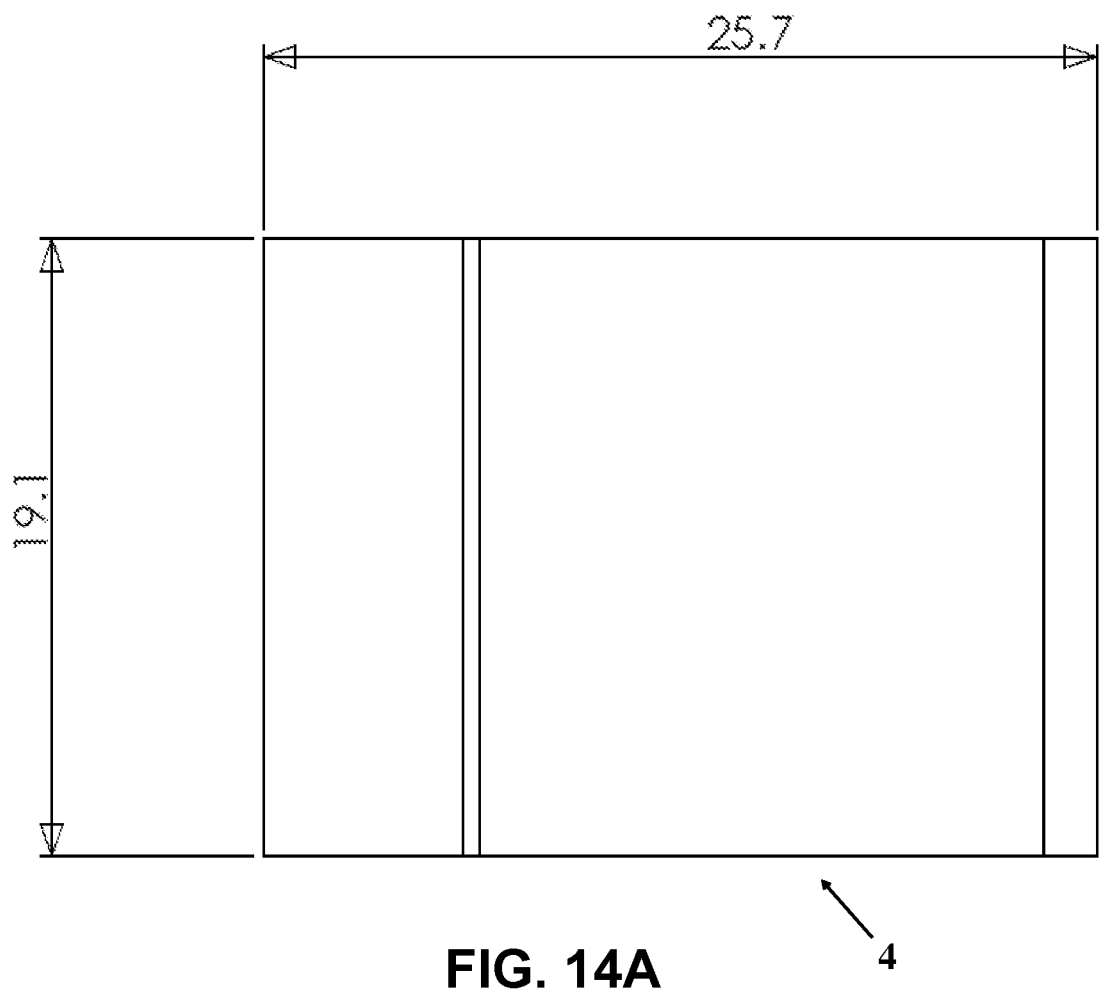
FIGS. 14A-14D show illustrations of various views of embodiments of a spring component of a device of the present invention.
Figure 14B:
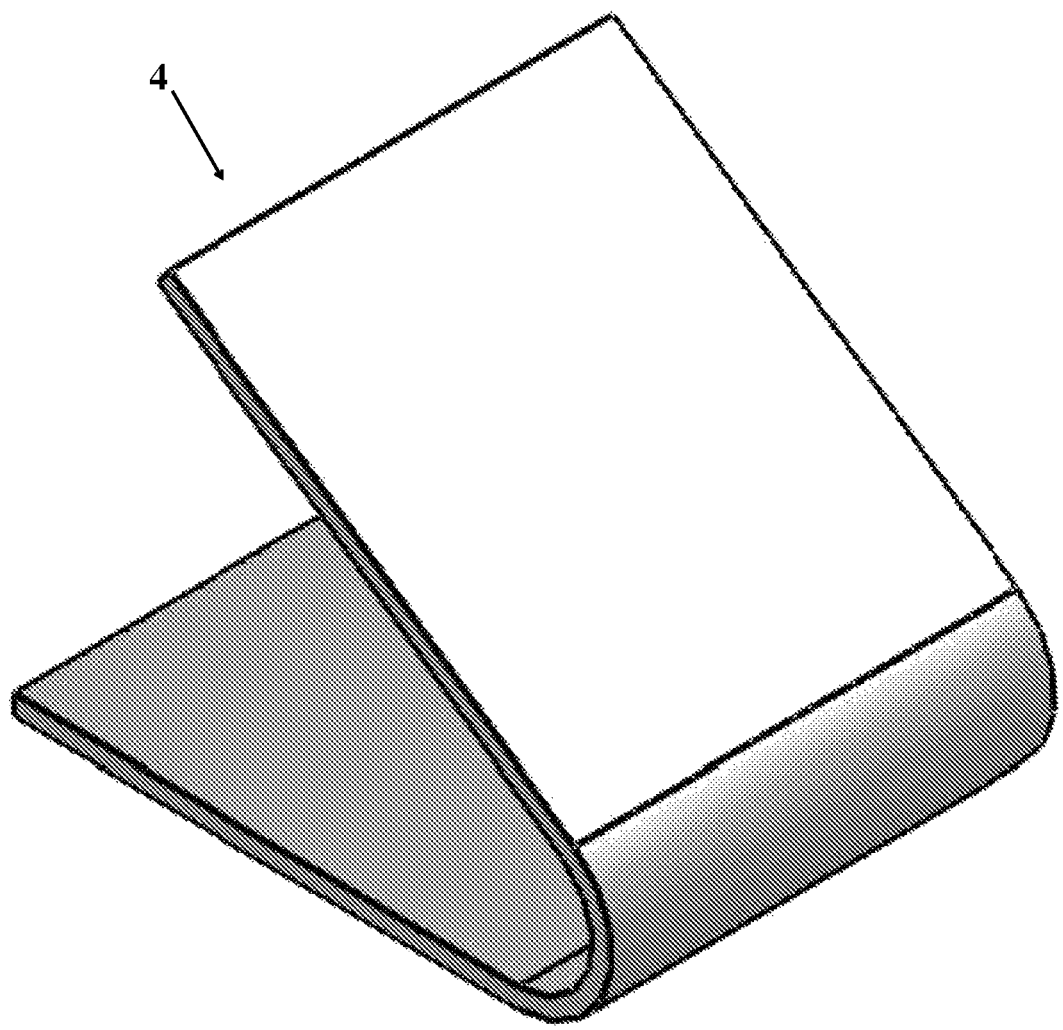
Figure 14C:
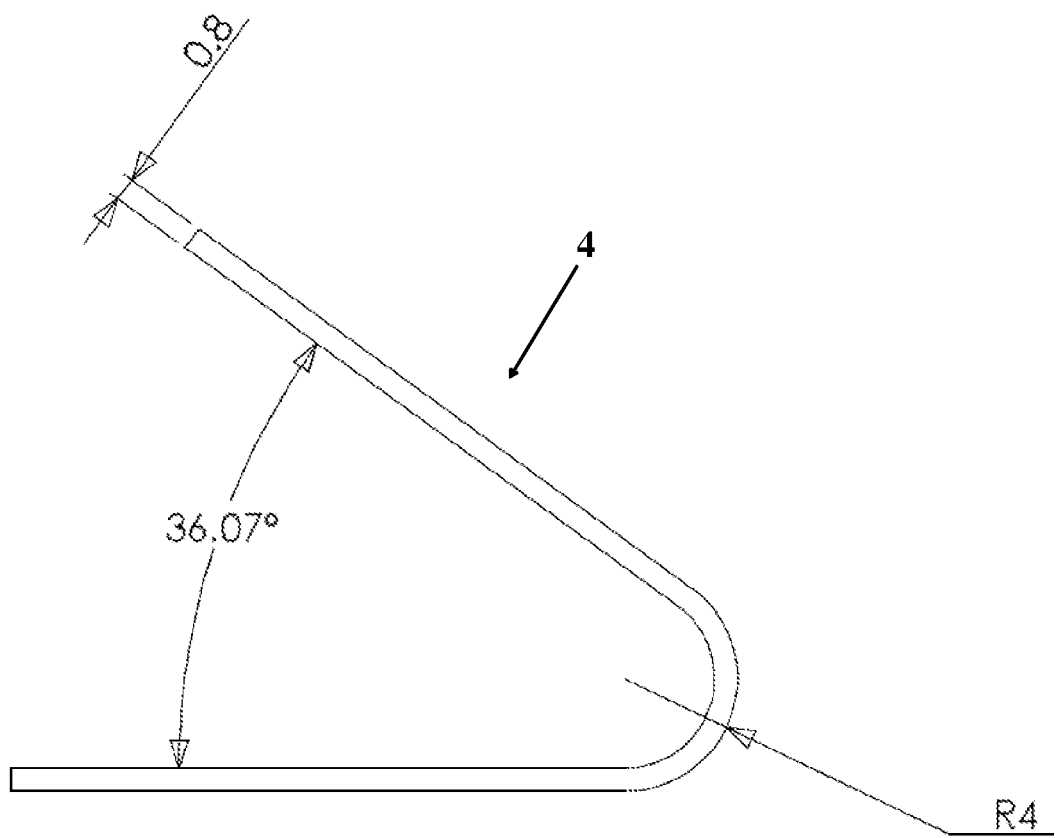
Figure 14D:
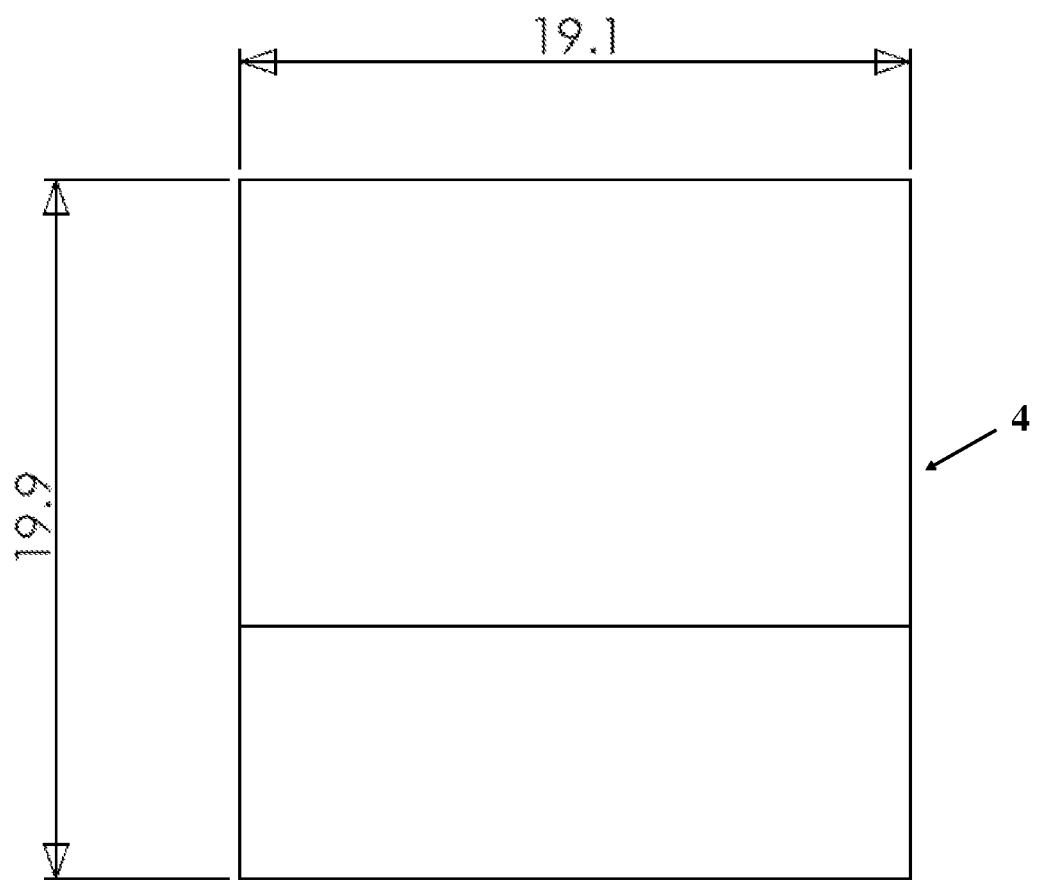

The attachment component may secure the strainer component 1 in place over a collection component with the attachment projection 14 positioned within the collection component and a rim of the collection component positioned against the bottom surface 18 of the strainer component 1 within the space between the attachment projection 14 and the curved wall 16 (see, for example FIGS. 1A and 1B). The attachment component may comprise a lever component (such as lever component 2 of FIGS. 10A-10F, for example) pivotably mounted to the strainer component 1, a grip component (such as grip component 3 of FIG. 12, for example) located adjacent a first end of the lever component for gripping a side wall of the collection component, and a spring component (such as spring component 4 of FIGS. 14A-14C, for example) located adjacent a second end of the lever component for spring loading the grip component against the side wall via the lever component. The first end of the lever component and the grip component of the attachment component may thereby pivot over the curved wall 16.

Figure 11:
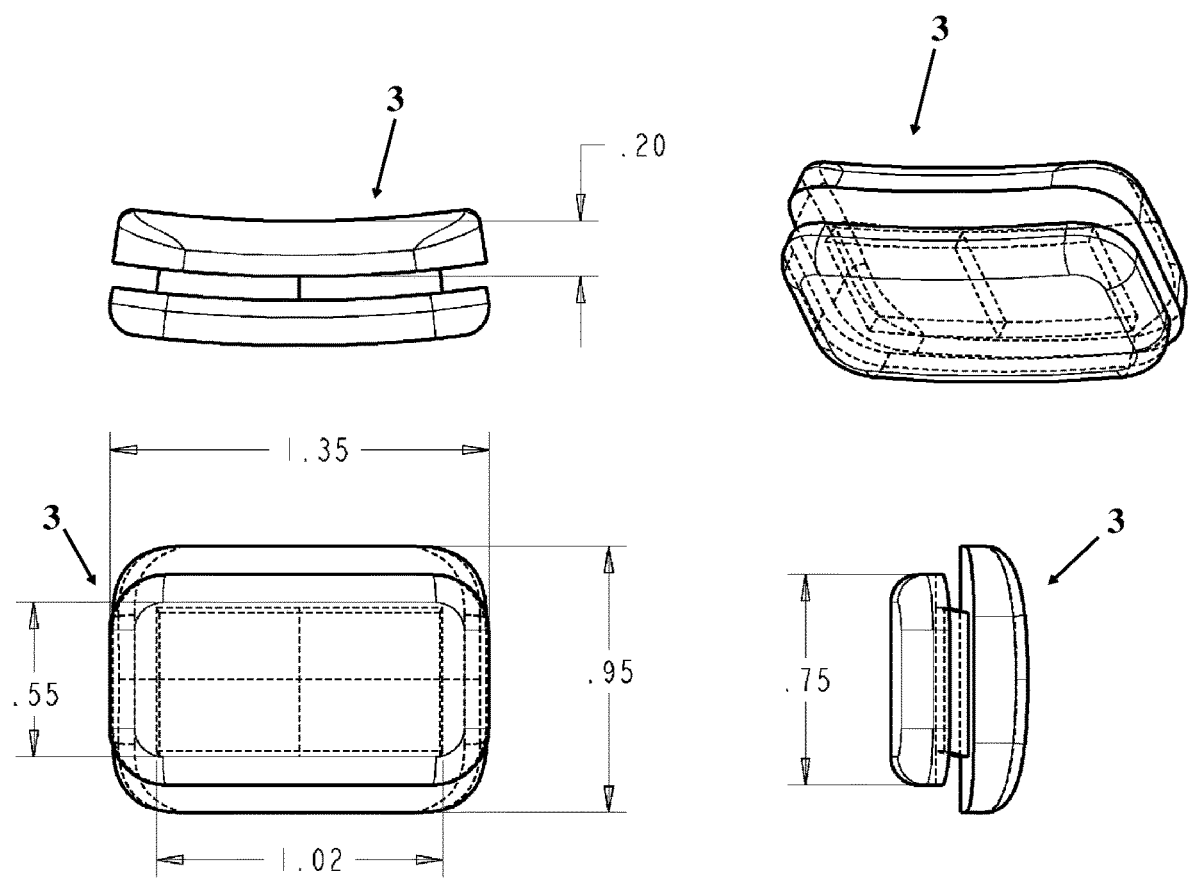
FIG. 11 shows illustrations of various views of embodiments of a grip component of a device of the present invention.
Figure 12:
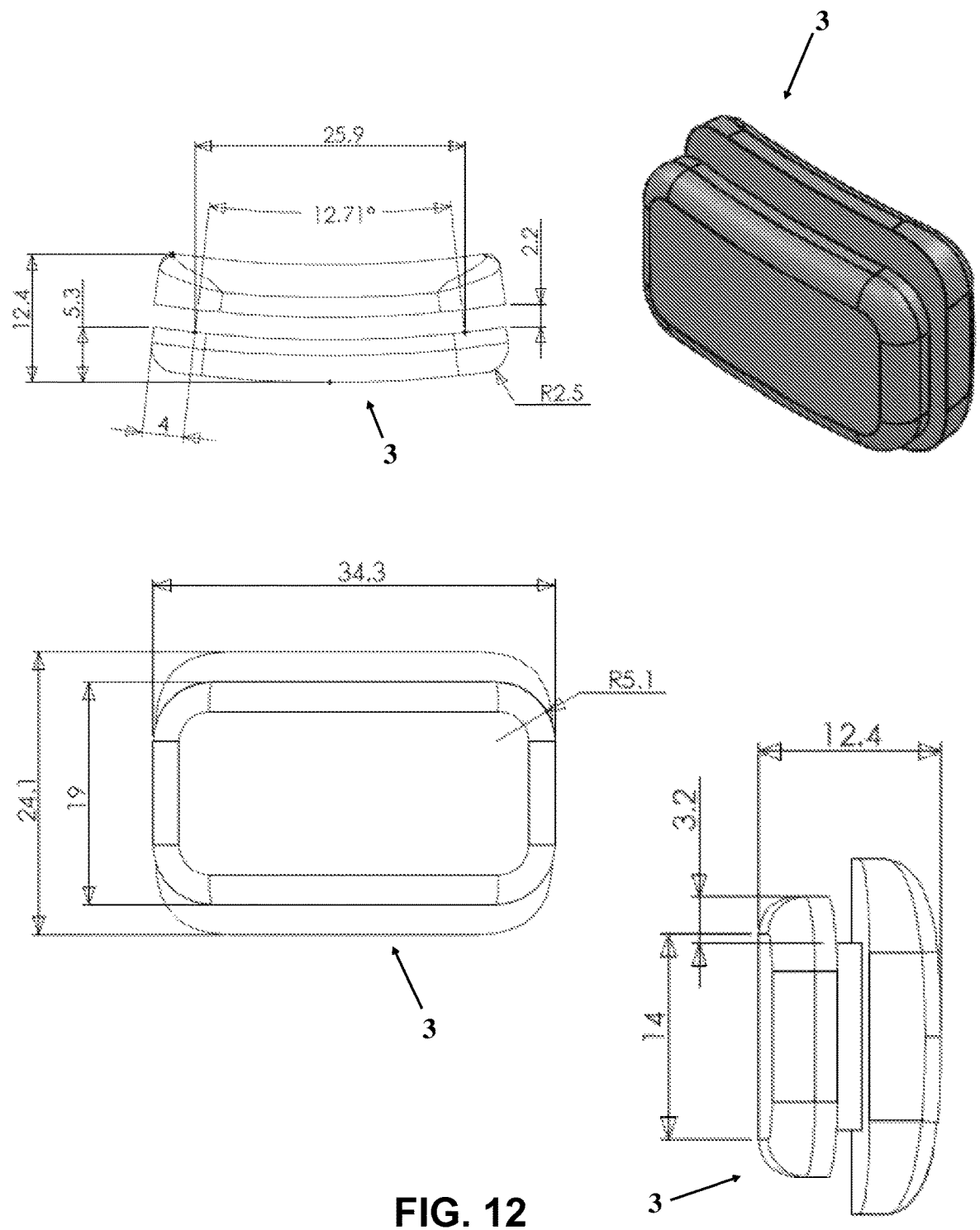
FIG. 12 shows illustrations of various views of embodiments of a grip component of a device of the present invention.
Figure 13:
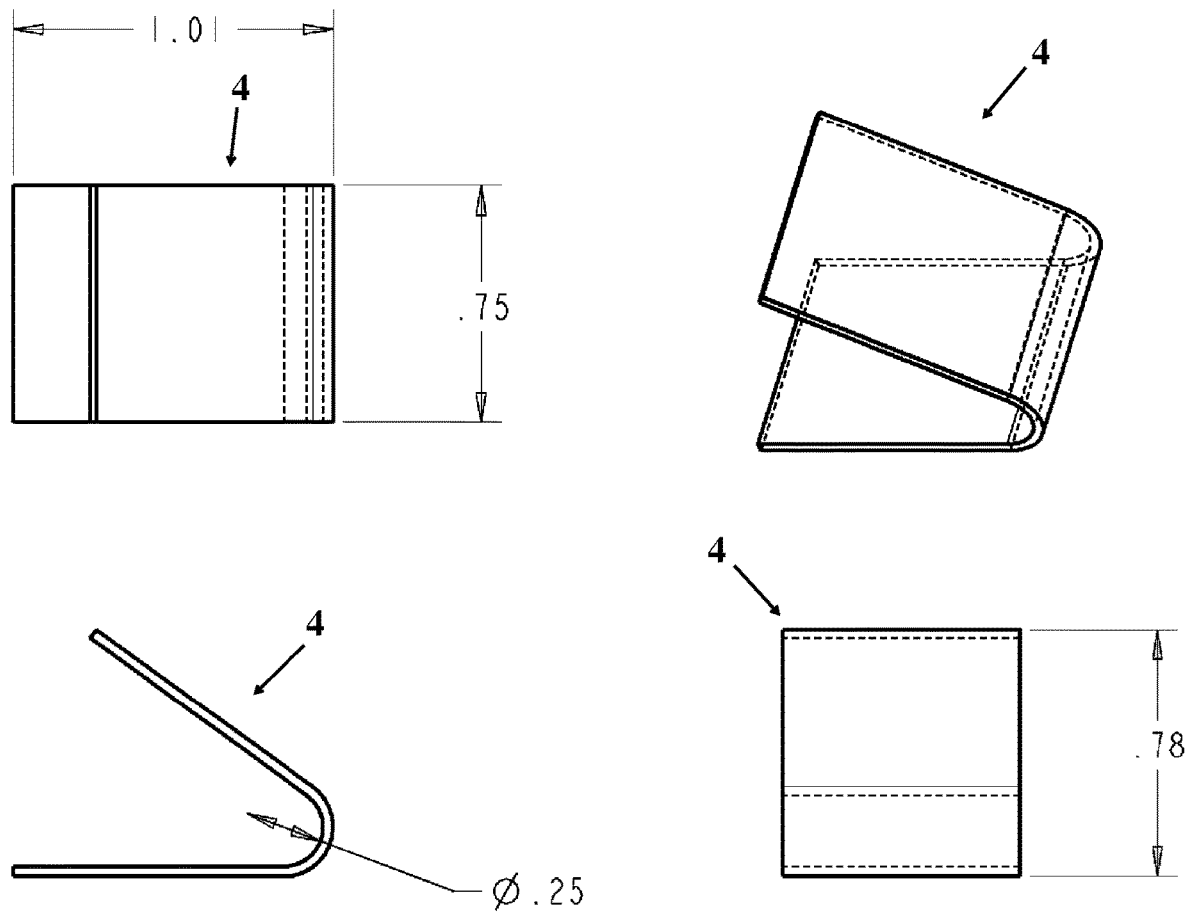
FIG. 13 shows illustrations of various views of embodiments of a spring component of a device of the present invention.

FIGS. 9 and 10A-10F illustrate various views of certain embodiments of a lever component of the present invention. FIGS. 11-12 illustrate various views of certain embodiments of a grip component of the present invention. FIGS. 13 and 14A-14D illustrate various views of certain embodiments of a spring component of the present invention.

In one embodiment, the attachment component is coupled to the strainer component at an outer edge portion of the strainer component. In a particular embodiment, the outer edge portion to which the attachment component is coupled is at or near the midpoint of the strainer component (see, e.g., FIGS. 1A-1B, 2A, and 4A-4F).

The surface of the strainer component can be configured to cover a portion of the collection component (see, e.g., FIGS. 1A-1B) or all of the collection component. In a particular embodiment, the strainer component is configured to have a substantially tapered planar form (see, e.g., FIGS. 1A-1B). The attachment component may be coupled at or near the tapered end of the strainer component (see, e.g., FIGS. 4A-4F).

As provided herein, the device is suitable for separating a solid component from a liquid, and particularly where the solid component is a solid food product. Therefore, the device of the present invention can be used in conjunction with a collection component that comprises any type of container that can hold a liquid. As mentioned previously, suitable containers can include, without limitation, a pan, a pot, a bowl, and variations thereof.

In one aspect, the present invention relates to a method of making the device for separating a solid component from a liquid. This method includes providing a strainer component and an attachment component; and coupling the strainer component to the attachment component to yield the device of the present invention.

In another aspect, the present invention relates to a method of separating a solid component from a liquid, which method comprises: providing a device as described herein; providing a liquid mixture comprising a solid component mixed with a liquid; and pouring the liquid mixture onto the surface of the device so that the liquid passes through the holes of the surface and the solid component is maintained on the surface, thereby separating the solid component from the liquid. In one embodiment, this method further comprises providing a collection component for collecting the liquid passed through the holes of the device or for maintaining the solid component after passing the liquid through the holes of the device. In one embodiment of this method, the device is attached to the collection component by the attachment component prior to said pouring step.

In one embodiment of the method, the device of the present invention is attached to the collection component (e.g., a pot, pan, bowl, or the like), and then the liquid mixture (which comprises the solid component mixed with the liquid) is poured onto the surface of the device, so that the liquid passes through the holes of the surface and into the collection component, thereby separating the solid component from the liquid. In this embodiment, the solid component does not enter the collection component, but is instead maintained on the top portion of the surface of the strainer component of the device. The solid component can then be collected from the device. The attachment component of the device has sufficient gripping strength to maintain the device in place during the straining process (e.g., pouring the liquid through the holes of the strainer component of the device).

In another embodiment of the method, the liquid mixture (which comprises the solid component mixed with the liquid) is introduced into the collection component (e.g., a pot, pan, bowl, or the like). The device can be attached to the collection component either before or after the liquid mixture is introduced into the collection component. Once the device is attached to the collection component and the liquid mixture is introduced into the collection component, the collection component can be manipulated (e.g., tipped) to allow the liquid to pass through the holes of the device and out of the collection component. This results in the solid component being maintained in the collection component and separated from the liquid.

FIGS. 15-18 illustrate alternative embodiments of the device of the present invention. As shown, these alternative embodiments differ with respect to the placement and number of attachment components.

FIG. 15 is a top view of a particular embodiment of the present invention. Illustrated are the planar top surface (10) and the plurality of slits and or holes (11). The biasing band (14) is attached along one curved lateral side of the device. An opening and spout (12 and 13) are positioned at the midpoint of the curved lateral side of the device and between the top surface (10) and the biasing band (14). The anchoring clips (15) extend downward from the biasing band (14) to secure the device to an existing container. In its preferred embodiment, the device is constructed as a single body and is preferably composed of a durable, washable, temperature resistant material.

FIG. 16 is a bottom view of a particular embodiment of the present invention. Illustrated are the top planar surface (10), the plurality of holes and slits (11), the biasing band (14), the spout (13) and the anchoring clips (15).

FIG. 17 is a depiction of the lateral side biasing band of a particular embodiment of the present invention. In the alternate embodiment, the device is constructed in a component manner. FIG. 17 is a depiction of the biasing band (14) that may be attached by appropriate means to the top planar surface (not depicted).

FIG. 18 is a depiction of the anchoring clip of a particular embodiment of the present invention.

The particular embodiment of the present invention allows for the device to be easily and conveniently attached to the peripheral rim of a variety of different sized containers. The anchoring clips and biasing band provide the means to secure the device to the peripheral rim of a container and prevent the device from detaching when the weight of the liquid and solid food products are placed upon the device.

It is apparent to those skilled in the art, however, that many changes, variations, modifications, and other uses and applications to the combined system are possible, and also such changes, variations, modifications, and other uses and applications which do not depart from the spirit and scope of the invention are deemed to be covered by the invention.

What is claimed is:

1. A method of separating a solid food component from a liquid, said method comprising:
   providing a separation device including:
      a strainer component including a top surface and a bottom surface and having a plurality of holes therethrough;

a curved wall extending from the bottom surface of the strainer component;
an attachment projection extending from the bottom surface of the strainer component; and
an attachment component coupled to said strainer component at an outer portion of the bottom surface of the strainer component for securing said separation device to a rim of a cooking vessel, the attachment component extending further from the bottom surface of the strainer component than the curved wall, said attachment component including:
a lever component pivotably mounted to the strainer;
a grip component located adjacent one end of the lever component for gripping a side wall of the cooking vessel; and
a spring component located adjacent a second end of the lever component for spring loading the grip component against said side wall via the lever component,
wherein the strainer component comprises a strainer portion with the plurality of holes to allow the liquid to pass through the strainer portion from the bottom surface to the top surface thereof while retaining the solid component, and an upwardly projecting tapered end portion extending from the strainer component to direct the liquid that passes through the strainer portion,
wherein the curved wall is positioned between the attachment component and the attachment projection, and the curved wall is spaced from the attachment projection;
attaching said separation device to a rim of a cooking vessel by engaging said attachment component with said rim such that the attachment projection is positioned within the collection component, said rim is positioned against the bottom surface of the strainer component within the space between the attachment projection and the curved wall, and the grip component is spring loaded against the side wall of the cooking vessel, thereby securing said strainer component over said cooking vessel, said cooking vessel containing a liquid food mixture comprising a solid food component mixed with a liquid; and
pouring the liquid food mixture onto the top surface of said strainer component so that the liquid passes through the plurality of holes of the strainer portion and over the upwardly projecting tapered end portion and the solid food component is retained within the cooking vessel by the bottom surface, thereby separating the solid food component from the liquid.

2. The method of claim 1, wherein the cooking vessel is selected from the group consisting of a pan, a pot, a bowl, and variations thereof.

3. The method of claim 1, wherein said attachment component is coupled to the strainer component at or near the upwardly projecting tapered end portion of the strainer component.

4. The method of claim 1, wherein the upwardly projecting tapered end portion of the strainer component extends from the strainer portion such that the top surface of the strainer component is a continuous surface.

5. The method of claim 4, wherein the spring component is situated between the lever component and the upwardly projecting tapered end portion of the strainer component.

6. The method of claim 1, wherein the strainer portion of the strainer component has a first planar section that extends along the rim of the cooking vessel, and a second section that extends upwardly from the first section, wherein each of the first and second sections includes the plurality of holes.

7. The method of claim 6, wherein the second section curves upwardly from the first section.

8. The method of claim 6, wherein the upwardly projecting tapered end portion extends upwardly from the first section of the strainer portion, and the second section of the strainer portion and the upwardly projecting tapered end portion are located on respective opposite sides of the first section of the strainer portion.

9. The method of claim 1, wherein each of the plurality of holes comprises a circular hole or a slit.

10. The method of claim 1, wherein the curved wall is curved along a width of the strainer component.

11. The method of claim 1, wherein the curved wall is wider than the attachment projection.

12. The method of claim 1, wherein the curved wall is curved about the attachment projection.

13. The method of claim 1, wherein the upwardly projecting tapered end portion is void of the plurality of holes.

14. The method of claim 1, wherein the upwardly projecting tapered end portion is concave with respect to the top surface of the of the strainer component.

15. The method of claim 1, wherein the strainer portion of the strainer component has a first planar section that extends along the rim of the cooking vessel, and a second curved section that extends upwardly from the first section.

16. The method of claim 15, wherein second section is convex with respect to the top surface of the of the strainer component.

17. The method of claim 16, wherein the upwardly projecting tapered end portion extends from the first planar section of the strainer portion.

18. The method of claim 17, wherein the upwardly projecting tapered end portion is concave with respect to the top surface of the of the strainer component.

* * * * *